United States Patent
Hirota

(10) Patent No.: US 11,240,442 B2
(45) Date of Patent: Feb. 1, 2022

(54) SIGNAL PROCESSING APPARATUS AND SIGNAL PROCESSING METHOD

(71) Applicant: Sony Corporation, Tokyo (JP)

(72) Inventor: Katsumi Hirota, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/979,175

(22) PCT Filed: Nov. 14, 2018

(86) PCT No.: PCT/JP2018/042131
§ 371 (c)(1),
(2) Date: Sep. 9, 2020

(87) PCT Pub. No.: WO2019/176170
PCT Pub. Date: Sep. 19, 2019

(65) Prior Publication Data
US 2020/0412934 A1 Dec. 31, 2020

(30) Foreign Application Priority Data
Mar. 16, 2018 (JP) .............................. JP2018-049956

(51) Int. Cl.
*H04N 5/235* (2006.01)
*H04N 5/232* (2006.01)
*H04N 5/353* (2011.01)

(52) U.S. Cl.
CPC ....... *H04N 5/2355* (2013.01); *H04N 5/23245* (2013.01); *H04N 5/23267* (2013.01); *H04N 5/3532* (2013.01)

(58) Field of Classification Search
CPC .......... H04N 5/23245; H04N 5/23267; H04N 5/23277; H04N 5/2327; H04N 5/3532
See application file for complete search history.

(56) References Cited

U.S. PATENT DOCUMENTS 9,049,372 B2 * 6/2015 Nakai ................ H04N 5/23296
9,210,333 B2 * 12/2015 Ise ....................... H04N 5/2355
(Continued)

FOREIGN PATENT DOCUMENTS

| EP | 2569934 A1 | 3/2013 |
| JP | 2010-093679 A | 4/2010 |

(Continued)

OTHER PUBLICATIONS

International Search Report and Written Opinion dated Jan. 15, 2019 for PCT/JP2018/042131 filed on Nov. 14, 2018, 7 pages including English Translation of the International Search Report.

*Primary Examiner* — Daniel M Pasiewicz
(74) *Attorney, Agent, or Firm* — Xsensus LLP

(57) ABSTRACT

A signal processing apparatus includes: an acquisition unit configured to acquire, for each of frames, captured images corresponding to results of a plurality of exposures in the frame obtained by a sensor part including a plurality of pixels arranged in an array; and a generation unit configured to generate an output image on the basis of the captured image corresponding to a result of at least one of the plurality of exposures in the frame, wherein the generation unit, in a case where a camera shake correction function is enabled and an exposure time of at least one of the plurality of exposures is shorter than a threshold, generates a first output image by correcting a brightness of the captured image based on the at least one of the plurality of exposure.

9 Claims, 13 Drawing Sheets

(56) References Cited

U.S. PATENT DOCUMENTS

2009/0086061 A1* 4/2009 Asoma ............... H04N 5/23245
                                                            348/241
2010/0302595 A1   12/2010 Yamada
2014/0002694 A1   1/2014 Levy

FOREIGN PATENT DOCUMENTS

| JP | 2012-231273 A | 11/2012 |
| JP | 2017-184094 A | 10/2017 |

* cited by examiner

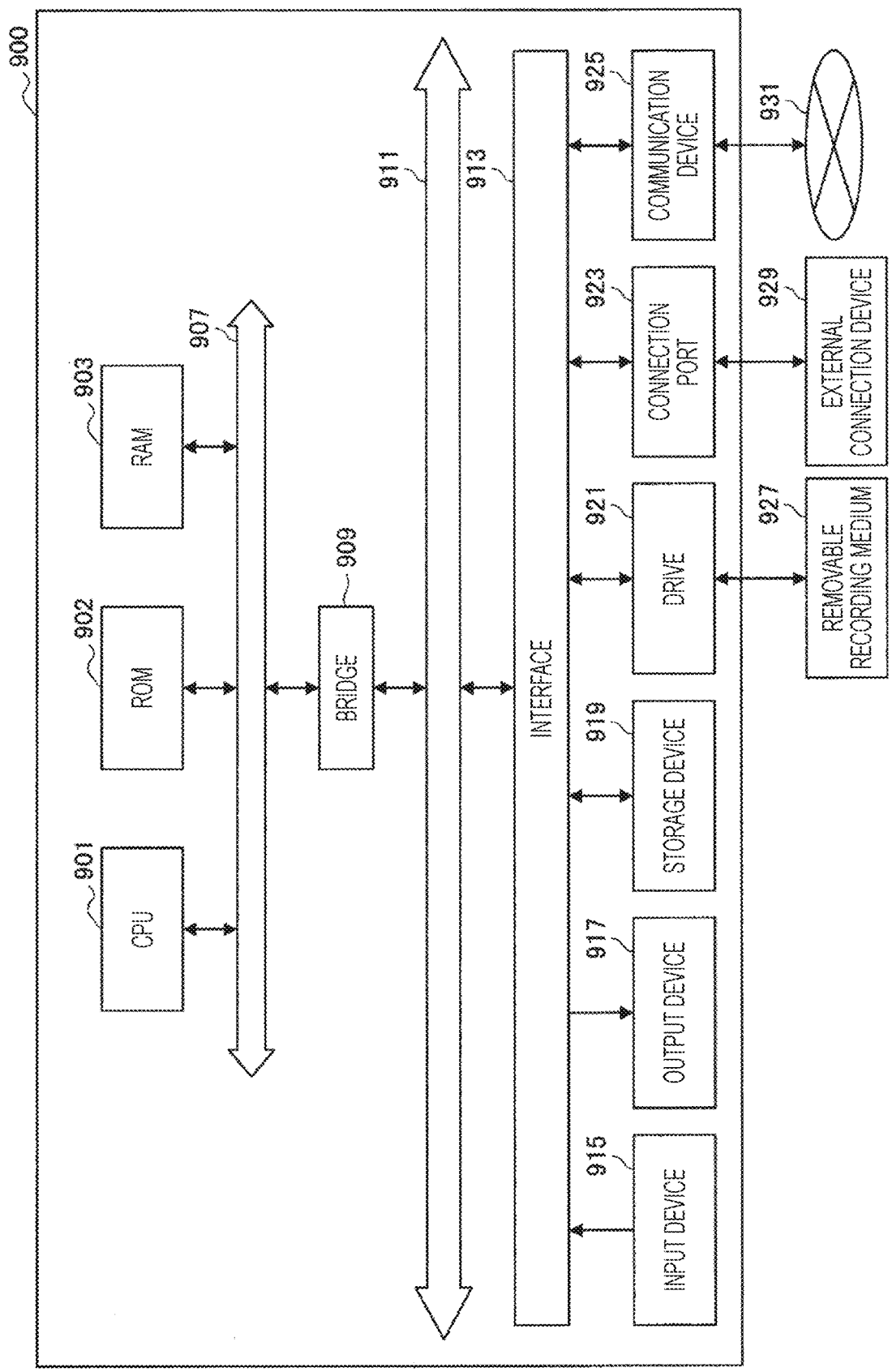

SIGNAL PROCESSING APPARATUS AND SIGNAL PROCESSING METHOD

CROSS-REFERENCE TO RELATED APPLICATIONS

The present application is based on PCT filing PCT/JP2018/042131, filed Nov. 14, 2018, which claims priority to JP 2018-049956, filed Mar. 16, 2018, the entire contents of each are incorporated herein by reference.

TECHNICAL FIELD

The present disclosure relates to a signal processing apparatus and a signal processing method.

BACKGROUND ART

An image capturing apparatus such as a digital still camera or a digital video camera, which includes a CCD image sensor or a CMOS image sensor and which is configured to capture a still image or a moving image, is known. Some of such image capturing apparatuses are provided with a function called High Dynamic Range (HDR) for expanding a dynamic range. For example, Patent Document 1 discloses an example of a technology for capturing an HDR image.

Furthermore, some of the above-described image capturing apparatuses have a camera shake correction function.

CITATION LIST

Patent Document

Patent Document 1: Japanese Patent Application Laid-Open No. 2017-184094

SUMMARY OF THE INVENTION

Problems to be Solved by the Invention

Meanwhile, even in a case where the camera shake correction function is enabled, in a situation where a subject itself moves, the subject captured in an image may be blurred, that is, subject blurring may occur. In particular, in a case where the camera shake correction function and the function of the HDR are used together, the blurring of the subject captured in an image may be apparent more conspicuously depending on the image capturing conditions.

Therefore, the present disclosure proposes a technology that can both ensure the dynamic range of an image and suppress image blurring in a more suitable manner.

Solutions to Problems

According to the present disclosure, there is provided a signal processing apparatus including: an acquisition unit configured to acquire, for each of frames, captured images corresponding to results of a plurality of exposures in the frame obtained by a sensor part including a plurality of pixels arranged in an array; and a generation unit configured to generate an output image on the basis of the captured image corresponding to a result of at least one of the plurality of exposures in the frame, in which the generation unit, in a case where a camera shake correction function is enabled and an exposure time of at least one of the plurality of exposures is shorter than a threshold, generates a first output image by correcting a brightness of the captured image based on the at least one of the plurality of exposures.

Furthermore, according to the present disclosure, there is provided a signal processing method that causes a computer to perform: acquiring, for each of frames, captured images corresponding to results of a plurality of exposures in the frame obtained by a sensor part including a plurality of pixels arranged in an array; and generating an output image on the basis of the captured image corresponding to a result of at least one of the plurality of exposures in the frame, in which in a case where a camera shake correction function is enabled and an exposure time of at least one of the plurality of exposures is shorter than a threshold, a first output image is generated by correcting a brightness of the captured image based on the at least one of the plurality of exposure.

Effects of the Invention

As described above, according to the present disclosure, there is provided a technology that can both ensure the dynamic range of an image and suppress the blurring of a subject in a more suitable manner.

Note that the effects described above are not necessarily limited, and any of the effects described in the present specification or other effects that can be grasped from the present specification may be exerted together with or in place of the above effects.

BRIEF DESCRIPTION OF DRAWINGS

FIG. 15 is a functional block diagram illustrating an example of a hardware configuration of an information processing apparatus included in the image capturing system according to the embodiment.

MODE FOR CARRYING OUT THE INVENTION

Hereinafter, preferred embodiments of the present disclosure will be described in detail with reference to the accompanying drawings. Note that in the specification and the drawings, components having substantially the same functional configuration are denoted by the same reference signs, and the same description is not repeated.

Note that the description will be made in the following order.
1. Configuration
1.1. System Configuration
1.2. Configuration of Solid-state Image Capturing Apparatus
1.3. Functional Configuration of Signal Processing Apparatus
2. Study on Achieving Both Ensuring Dynamic Range and Suppressing Blurring
2.1. Overview
2.2. Principle of Double Image Appearance
3. Technical Features
3.1. Basic Principles
3.2. Processing
4. Hardware Configuration
5. Conclusion

1. CONFIGURATION

Figure 1:
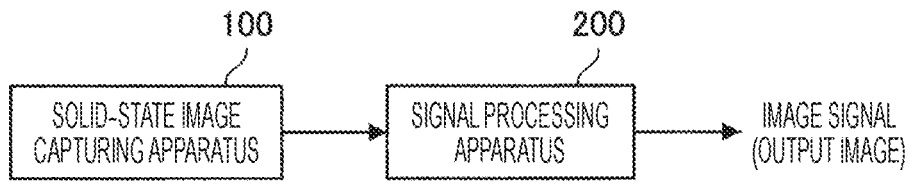
FIG. 1 is an explanatory diagram for describing an overview of an example of a system configuration of an image capturing system according to an embodiment of the present disclosure.

An example of the configuration of an image capturing system according to an embodiment of the present disclosure will be described below.
<1.1. System Configuration>
First, an example of a schematic system configuration of an image capturing system according to an embodiment of the present disclosure will be described with reference to FIG. 1. FIG. 1 is an explanatory diagram for describing an overview of an example of a system configuration of an image capturing system according to the embodiment of the present disclosure.

FIG. 1 schematically illustrates a solid-state image capturing apparatus (image sensor) 100 included in an image capturing system 1 according to the present embodiment. The solid-state image capturing apparatus 100 is an imaging element that captures an image of a subject to acquire digital data of the captured image such as a Complementary Metal-Oxide Semiconductor (CMOS) image sensor, a Charge Coupled Device (CCD) image sensor, or the like.

Furthermore, FIG. 1 schematically illustrates a signal processing apparatus 200 that performs signal processing (image processing) on an image signal supplied on the basis of a pixel signal from each pixel of the solid-state image capturing apparatus 100. The signal processing apparatus 200 may be configured as, for example, a signal processing Large Scale Integration (LSI). In this case, the image capturing system 1 (that is, the signal processing LSI and the solid-state image capturing apparatus 100) may be configured as a camera module. Furthermore, as another example, the signal processing apparatus 200 may be configured as an external apparatus different from the solid-state image capturing apparatus 100. Furthermore, as another example, a configuration corresponding to the signal processing apparatus 200 may be configured as a part of the solid-state image capturing apparatus 100. Note that in the following description, an image signal output from the solid-state image capturing apparatus 100, that is, an image corresponding to a result of image capturing performed by the solid-state image capturing apparatus 100 is also referred to as a "captured image".

Examples of signal processing performed on a captured image by the signal processing apparatus 200 includes, for example, black level correction, color mixture correction, defect correction, demosaic processing, matrix processing, gamma correction, YC conversion, and the like. Furthermore, the signal processing apparatus 200 according to the present embodiment may perform processing related to generation of an HDR image with a wide dynamic range, camera shake correction processing, and the like. Note that details of an example of the processing related to generation of an HDR image and the camera shake correction processing will be separately described below.

That is, as illustrated in FIG. 1, in the image capturing system 1 according to the present embodiment, the solid-state image capturing apparatus 100 photoelectrically converts light incident through an optical element that is not illustrated and performs A/D conversion on the pixel value of each pixel to generate a captured image of a subject. Then, the solid-state image capturing apparatus 100 outputs the generated captured image (that is, an image signal) to the signal processing apparatus 200.

The signal processing apparatus 200 acquires a captured image from the solid-state image capturing apparatus 100, performs signal processing (image processing) on the acquired captured image, and outputs the captured image after the signal processing as an output image to a predetermined output destination. Furthermore, the signal processing apparatus 200 may store the output image described above as image data in, for example, a storage unit that is not illustrated. Furthermore, the signal processing apparatus 200 may perform signal processing on a captured image sequentially output from the solid-state image capturing apparatus 100 for each frame to generate an output image for the frame. In this case, the signal processing apparatus 200 may output a series of output images each generated for one of the plurality of frames as a moving image.

The example of a schematic system configuration of the image capturing system according to the embodiment of the present disclosure has been described with reference to FIG. 1.

<1.2. Configuration of Solid-State Image Capturing Apparatus>

Figure 2:
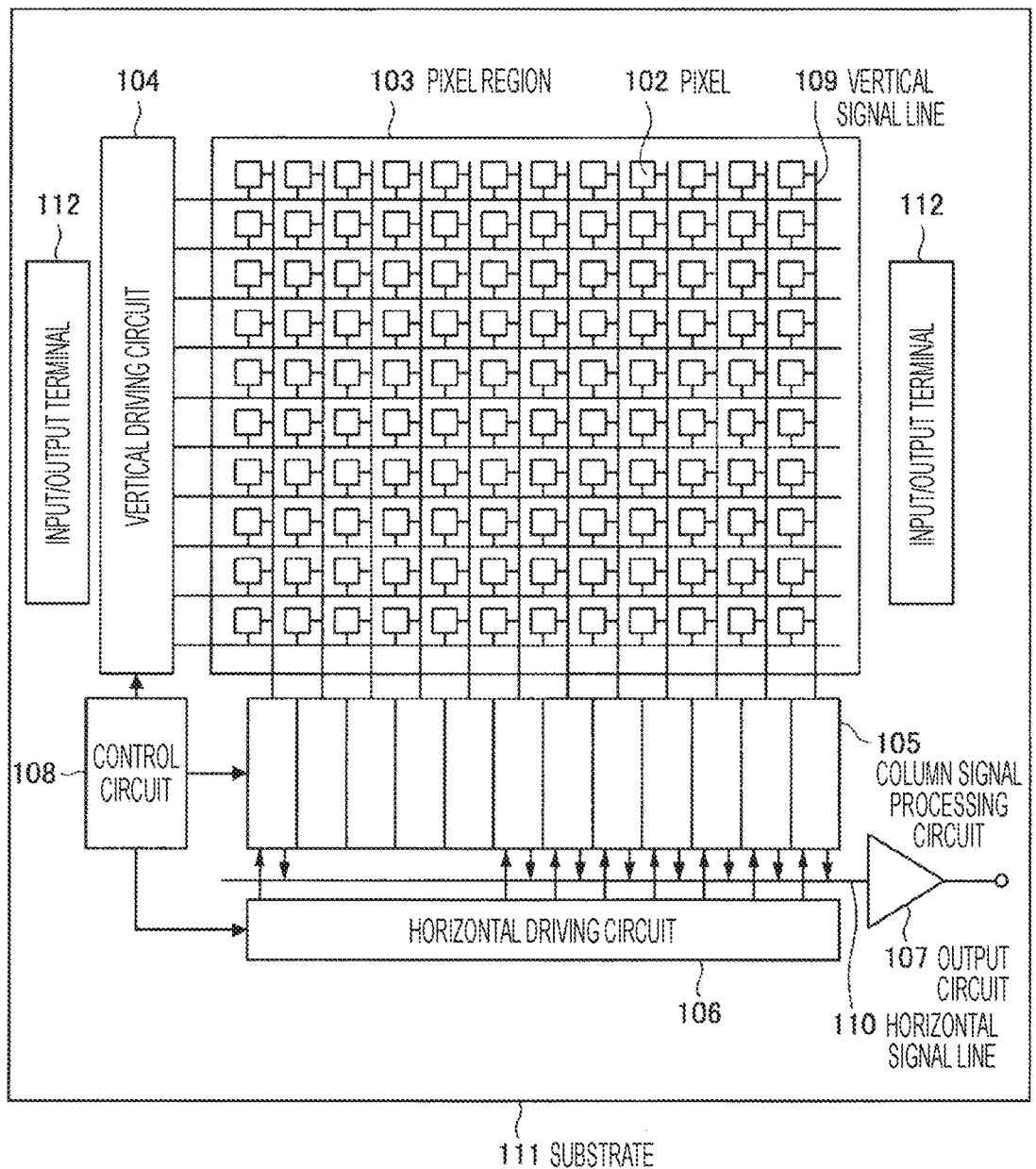
FIG. 2 is a diagram illustrating an example of a schematic configuration of a solid-state image capturing apparatus included in the image capturing system according to the embodiment.

Next, an example of a configuration of a solid-state image capturing apparatus included in the image capturing system according to the embodiment of the present disclosure will be described with reference to FIG. 2. FIG. 2 is a diagram illustrating an example of a schematic configuration of a solid-state image capturing apparatus included in the image capturing system according to the embodiment of the present disclosure. Specifically, FIG. 2 illustrates an example of a case where the solid-state image capturing apparatus is configured as a MOS image sensor such as a Complementary Metal Oxide Semiconductor (CMOS) image sensor.

As illustrated in FIG. 2, the solid-state image capturing apparatus 100 includes a pixel array (pixel region) 103 and a peripheral circuit part. The pixel array is formed by regularly arranging a plurality of pixels 102, each of which includes a photoelectric conversion part, in a two-dimensional array on the semiconductor substrate 111, for example, a silicon substrate. The pixel 102 includes, for example, a photodiode serving as a photoelectric conversion part, and a plurality of pixel transistors (MOS transistors). The plurality of pixel transistors can include three transistors, for example, a transfer transistor, a reset transistor, and an amplification transistor. The plurality of pixel transistors can include four transistors by also adding a selection transistor. The pixel 102 can be configured as one unit pixel.

Furthermore, the pixel 102 can have a shared pixel structure. The shared pixel structure includes a plurality of photodiodes, a plurality of transfer transistors, one shared floating diffusion, and one of each of the other pixel transistors that are shared. That is, a shared pixel is formed such that photodiodes and transfer transistors included in a plurality of unit pixels share the one of each of the other pixel transistors. Note that, the pixel array 103 corresponds to an example of a "sensor part" in the solid-state image capturing apparatus 100.

The peripheral circuit part includes a vertical driving circuit 104, column signal processing circuits 105, a horizontal driving circuit 106, an output circuit 107, a control circuit 108, and the like.

The control circuit 108 receives an input clock and data instructing an operation mode and the like, and outputs data such as internal information of the solid-state image capturing apparatus. That is, the control circuit 108 generates a clock signal and a control signal, which serve as references for the operations of the vertical driving circuit 104, the column signal processing circuits 105, the horizontal driving circuit 106, and the like on the basis of the vertical synchronization signal, the horizontal synchronization signal, and the master clock. Then, these signals are input to the vertical driving circuit 104, the column signal processing circuits 105, the horizontal driving circuit 106, and the like.

The vertical driving circuit 104 includes, for example, a shift register, selects a pixel driving wiring, and supplies a pulse for driving pixels to the selected pixel driving wiring to drive pixels in a row as a unit. In other words, the vertical driving circuit 104 selects and scans each pixel 102 of the pixel array 103 in row units sequentially in the vertical direction, and supplies a pixel signal based on a signal charge generated according to the amount of light received in, for example, a photodiode serving as a photoelectric conversion part of each pixel 102 to the column signal processing circuit 105 through a vertical signal line 109.

The column signal processing circuit 105 is arranged, for example, for each column of the pixels 102, and performs signal processing such as noise reduction on signals output from the pixels 102 in one row for each pixel column. That is, the column signal processing circuit 105 performs signal processing such as CDS for reducing fixed pattern noise unique to the pixel 102, signal amplification, and AD conversion. At the output stage of the column signal processing circuit 105, a horizontal selection switch (not illustrated) is provided so as to be connected to a horizontal signal line 110.

The horizontal driving circuit 106 includes, for example, a shift register, sequentially selects each of the column signal processing circuits 105 by sequentially outputting horizontal scanning pulses to make each of the column signal processing circuits 105 output a pixel signal to the horizontal signal line 110.

The output circuit 107 performs signal processing on signals sequentially supplied from each of the column signal processing circuits 105 through the horizontal signal line 110, and outputs the processed signals. For example, only buffering may be performed, or black level adjustment, correction of variation among columns, various types of digital signal processing, and the like may be performed. An input/output terminal 112 exchanges signals with external circuits.

The example of a configuration of the solid-state image capturing apparatus included in the image capturing system according to the embodiment of the present disclosure has been described with reference to FIG. 2.

<1.3. Functional Configuration of Signal Processing Apparatus>

Figure 3:
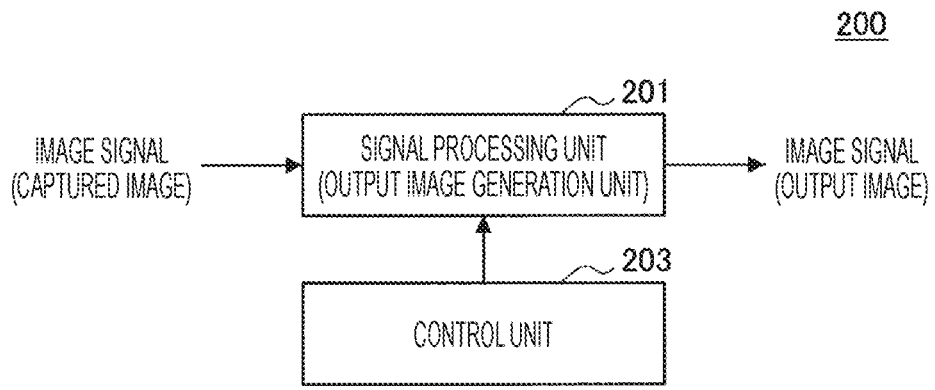
FIG. 3 is a block diagram illustrating an example of a functional configuration of a signal processing apparatus included in the image capturing system according to the embodiment.

Next, an example of a functional configuration of a signal processing apparatus included in the image capturing system according to the embodiment of the present disclosure will be described with reference to FIG. 3. FIG. 3 is a block diagram illustrating an example of a functional configuration of a signal processing apparatus included in the image capturing system according to the embodiment of the present disclosure.

As illustrated in FIG. 3, the signal processing apparatus 200 includes a signal processing unit 201 and a control unit 203. Note that, the signal processing apparatus 200 may have a component that executes a function other than signal processing, but in the example illustrated in FIG. 3, a component other than the signal processing unit 201 or the control unit 203 is not illustrated.

The signal processing unit 201 generates an output image by performing various types of signal processing on an image signal input to the signal processing apparatus 200, that is, a captured image output from the solid-state image capturing apparatus 100. Note that, an example of the signal processing is as described above. Furthermore, the signal processing performed by the signal processing unit 201 on the captured image may be controlled by the control unit 203. Note that in the signal processing unit 201, a part that acquires a captured image from the solid-state image capturing apparatus 100 corresponds to an example of an "acquisition unit". Furthermore, a part of the signal processing unit 201 that generates an output image corresponds to an example of a "generation unit".

The control unit 203 controls the operation of the signal processing unit 201, that is, the signal processing performed on a captured image in accordance with various conditions. For example, the control unit 203 may control the signal processing in accordance with an instruction from a user via a predetermined input unit (not illustrated). As a more specific example, the control unit 203 may control the operation of the signal processing unit 201 in such a way that the camera shake correction processing is performed on an input captured image in a case where the camera shake correction function is enabled. Similarly, the control unit 203 may control the operation of the signal processing unit 201 in such a way that an HDR image is generated as an output image on the basis of an input captured image in a case where the HDR function is enabled. Furthermore, the control unit 203 may control the operation of the signal processing unit 201 in accordance with a combination of enabled functions and image capturing conditions such as a shutter speed, an aperture, and a white balance.

Note that the above-described configuration is merely an example, and the functional configuration of the signal processing apparatus 200 is not necessarily limited to the example illustrated in FIG. 3. For example, a part of the components included in the signal processing apparatus 200 may be provided outside the signal processing apparatus 200. Furthermore, each function of the signal processing apparatus 200 may be implemented by a plurality of devices operating in cooperation.

The example of a functional configuration of the signal processing apparatus included in the image capturing system according to the embodiment of the present disclosure has been described with reference to FIG. 3.

2. STUDY ON ACHIEVING BOTH ENSURING DYNAMIC RANGE AND SUPPRESSING BLURRING

Next, after describing an overview of each of the processing related to generation of an HDR image and the processing related to the camera shake correction, a technical problem that arises in achieving both ensuring the dynamic range of an image and suppression of blurring that is apparent in the image will be described.

<2.1. Overview>

First, an overview of an example of processing related to generation of an HDR image will be described. For example, an imaging element (solid-state image capturing apparatus) having a relatively large cell size can receive light with high sensitivity even in a scene with a small amount of light. Therefore, in a situation where overexposure occurs, an image with a wide dynamic range can be captured by adjusting (i.e., increasing) the shutter speed so that the gradation of a portion where overexposure would occur is not impaired. On the other hand, for an imaging element having a relatively small cell size, it may be difficult to receive light with high sensitivity in a scene with a small amount of light. In such a case, it may be difficult to capture an image with a wide dynamic range only by adjustment of the shutter speed as described above. Even in such a case, by using a technology called HDR, it is possible to generate an image having a wide dynamic range (that is, an HDR image) on the basis of the result of image capturing performed by the imaging element.

As a technology for generating an HDR image, there is a method of synthesizing a plurality of images captured with different exposure times. As a specific example, there is a method of performing a plurality of exposures in a time-division manner and synthesizing a plurality of images (captured images) with different exposure times based on the results of the plurality of exposures to generate an image having a dynamic range wider than each of the plurality of images (that is, an HDR image). In particular, in recent years, an imaging element capable of performing plurality of exposures in one frame by improving the speed of reading the light receiving result of each pixel has been proposed, and in a case where the above-described method is applied to such an imaging element, an HDR image can be generated for each frame.

Figure 4:
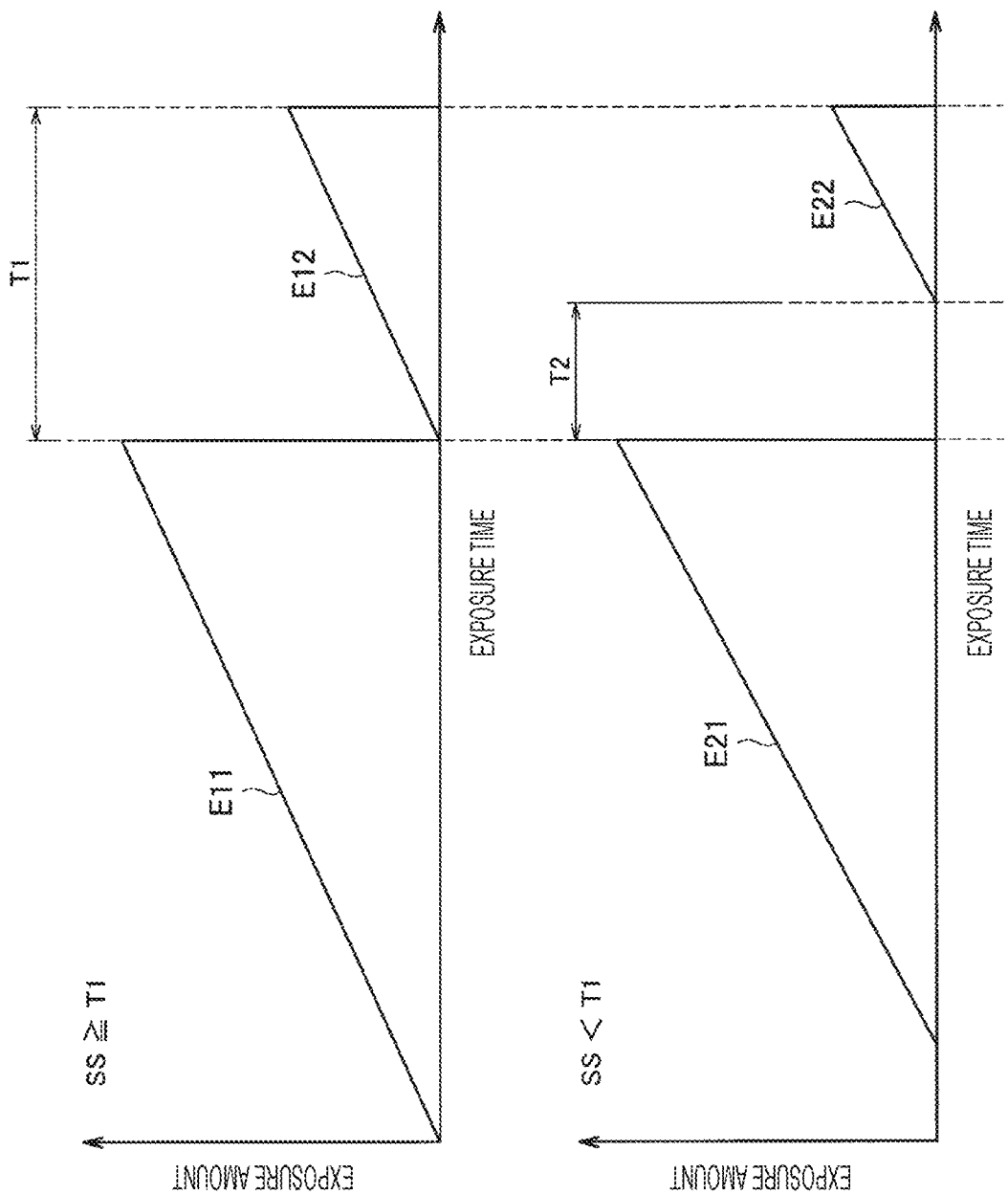
FIG. 4 is an explanatory diagram for describing an overview of an example of a flow of processing related to generation of an HDR image.

For example, FIG. 4 is an explanatory diagram for describing an overview of an example of processing related to generation of an HDR image, and schematically illustrates an exposure operation when an HDR image is generated. Specifically, in the figures illustrated on the upper side and the lower side of FIG. 4, the horizontal axis indicates the exposure time, and the vertical axis indicates the exposure amount. That is, in the example illustrated in FIG. 4, two exposures with different exposure times are performed in one frame, and an HDR image is generated on the basis of the results of the two exposures. More specifically, an image with long exposure (long exposure image) is generated by adding the results of the two exposures, and an image with short exposure (short exposure image) is generated on the basis of the result of one of the two exposures. Then, the generated long exposure image and short exposure image are synthesized to generate an HDR image. Note that the long exposure image corresponds to an example of the "first captured image", and the short exposure image corresponds to an example of a "second captured image".

As a more specific example, in the upper figure of FIG. 4, two exposures indicated by reference signs E11 and E12 are performed in this order in a time-division manner in one frame. At this time, the exposure time of the exposure E11 is set longer than the exposure time of the exposure E12. In this case, a long exposure image is generated by adding the respective exposure results of the exposures E11 and E12, and a short exposure image is generated on the basis of the exposure result of the exposure E12.

Meanwhile, in the case of the example illustrated in FIG. 4, due to hardware restriction of the imaging element, blurring of a subject in the image (hereinafter also referred to as a "double image") may appear in an HDR image generated for each frame. Specifically, such a double image tends to become more apparent in a case where the exposure time (in other words, a shutter speed) of at least some of a plurality of exposures in one frame is shorter than the reading time of the imaging element under a situation where an image of a moving object as a subject is captured. Note that in a case where the pixel array of the imaging element includes H rows of pixels in the vertical direction, the reading time of the imaging element corresponds to a time required to sequentially read data from the first row to the H-th row. For example, in FIG. 4, reference sign T1 indicates a reading time for each exposure of the imaging element.

Furthermore, reference sign SS indicates an exposure time in each exposure. As a specific example, in the example illustrated in FIG. 4, the exposure time SS corresponds to each of the exposure times of the exposures E11, E12, E21, and E22.

Specifically, the lower figure of FIG. 4 illustrates an example of a case where the exposure time SS of some of the plurality of exposures in one frame is shorter than the reading time T1 of the imaging element (SS<T1). Specifically, in the lower figure of FIG. 4, two exposures indicated by reference signs E21 and E22 are performed in this order in a time-division manner in one frame. At this time, the exposure time of the exposure E21 is set longer than the exposure time of the exposure E22. In this case, a long exposure image is generated by adding the respective exposure results of the exposures E21 and E22, and a short exposure image is generated on the basis of the exposure result of the exposure E22. In contrast, the upper figure of FIG. 4 corresponds to an example of a case where the exposure time SS of some of a plurality of exposures in one frame is equal to or longer than the reading time T1 of the imaging element (SS≥T1).

As illustrated in the lower figure of FIG. 4, in the case where the exposure time SS of the exposure E22 is shorter than the reading time T1 of the imaging element (SS<T1), a blank period T2, during which no exposure is performed, is generated between the exposure E21 and the exposure E22. In such a case, in a case where a long exposure image is generated by synthesizing the respective exposure results of the exposures E21 and E22, the exposures E21 and E22 become discontinuous, and the lack of information during the blank period T2 is apparent in the long exposure image as blurring of the subject (i.e., a double image). Note that the hardware restrictions of the imaging element will be described below in detail.

Figure 5:
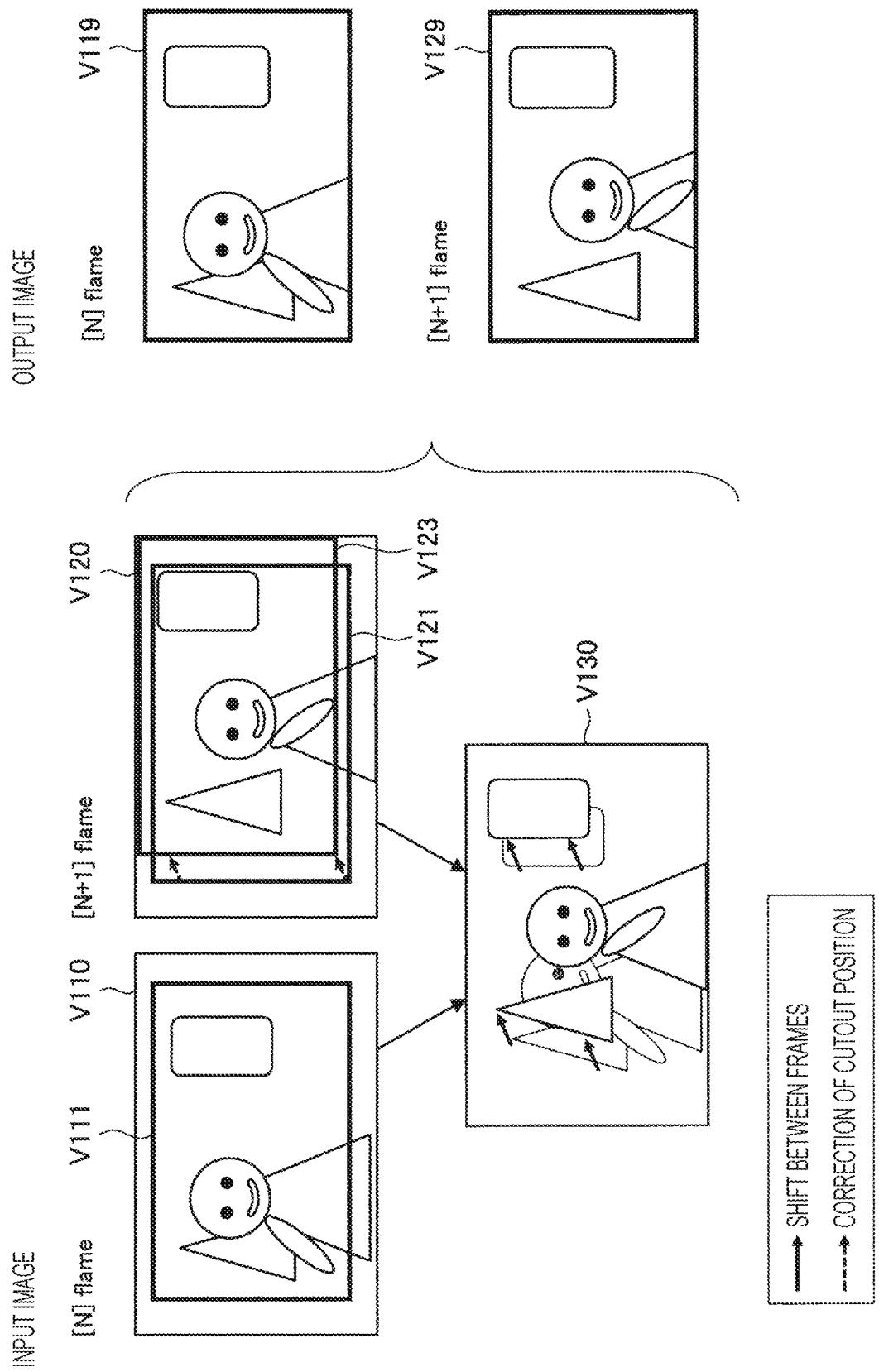
FIG. 5 is an explanatory diagram for describing an overview of an example of processing related to camera shake correction.

Next, an overview of an example of processing related to camera shake correction will be described. For example, FIG. 5 is an explanatory diagram for describing an overview of an example of processing related to camera shake correction, and mainly illustrates an example of a camera shake correction method assuming capturing of a moving image. In FIG. 5, reference signs V110 and V120 indicate images captured in the sequential frame N and the frame N+1, respectively, before the camera shake correction is performed. That is, the images V110 and V120 correspond to the input images of the processing related to the camera shake correction. Furthermore, reference sign V130 corresponds to an image acquired by superimposing the images V110 and V120, and indicates schematic illustration of a shift generated between images V110 and V120 due to camera shake. Furthermore, reference signs V119 and V129 indicate images after the camera shake correction corresponding to the frame N and the frame N+1, respectively.

In the example illustrated in FIG. 5, an output image is generated by cutting out a partial region from each of the images captured for respective frames (that is, input images). At this time, the image shift between the plurality of frames is calculated by detecting the difference in the position and orientation of the imaging element between the plurality of frames by using various sensors such as an acceleration sensor and a gyro sensor. Then, on the basis of the calculated image shift between the plurality of frames, for at least some of the plurality of frames, the position and range of the region cut out from the input image as the output image are corrected.

As a specific example, in the example illustrated in FIG. 5, the position of a region cut out as the output image and V129 from the input image V120 corresponding to the frame N+1 is corrected in accordance with the image shift between the frame N and the frame N+1. More specifically, reference sign V111 indicates schematic illustration of a region cut out from the input image V110 corresponding to frame N as the output image V119. Furthermore, reference signs V121 and V123 indicate schematic illustration of regions cut out from the input image V120 corresponding to the frame N+1 as the output image V129. Note that the region V121 corresponds to a region before the cutout position is corrected, and is set to a position similar to the region V111 in the input image V110. On the other hand, the region V123 indicates a region after the cutout position is corrected in accordance with the image shift between the frame N and the frame N+1.

As described above, by generating the output images V119 and V129 corresponding to the frame N and the frame N+1, respectively, image blurring (that is, camera shake) between the frame N and the frame N+1 is corrected.

On the other hand, when the processing related to generation of the HDR image described with reference to FIG. 4 and the processing related to the camera shake correction described with reference to FIG. 5 are used together, part of blurring in the image may be emphasized due to the processing of camera shake correction. For example, FIG. 6 is an explanatory diagram for describing an example of a processing result in a case where generation of an HDR image and the camera shake correction are used together.

Figure 6:
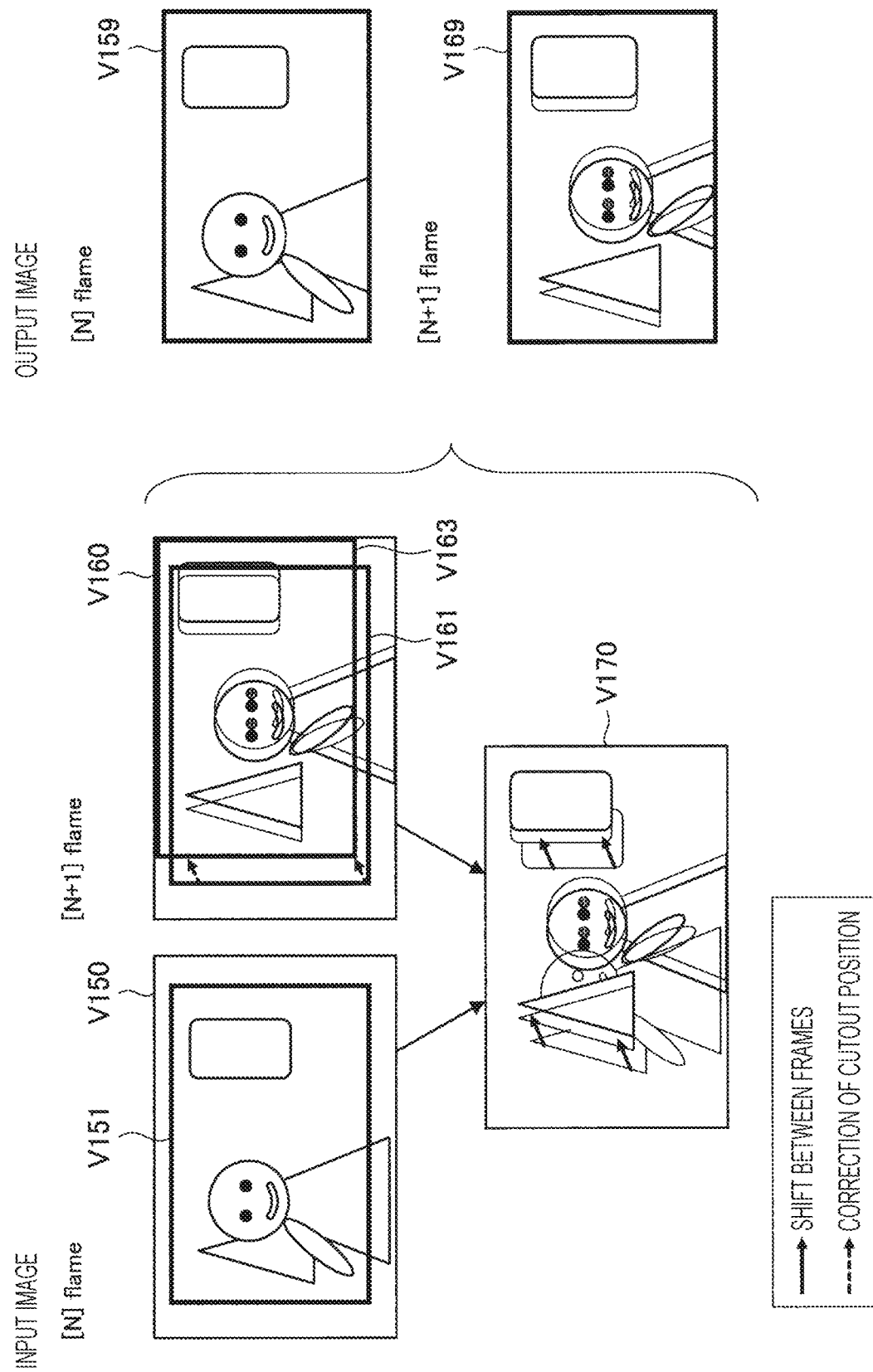
FIG. 6 is an explanatory diagram for describing an example of a processing result in a case where generation of an HDR image and the camera shake correction are used together.

In FIG. 6, reference signs V150 and V160 indicate images captured in the sequential frame N and the frame N+1, respectively, before the camera shake correction is performed (that is, input images). Furthermore, reference sign V170 corresponds to an image acquired by superimposing the input images V150 and V170, and indicates schematic illustration of a shift generated between the input images V150 and V160 due to camera shake. Furthermore, reference signs V159 and V179 indicate images after the camera shake correction (that is, output images) corresponding to the frame N and the frame N+1, respectively. Furthermore, a reference sign V151 indicates schematic illustration of a region cut out from the input image V150 corresponding to the frame N as the output image V159. Furthermore, reference signs V161 and V163 indicate schematic illustration of regions cut out from the input image V160 corresponding to the frame N+1 as an output image V169. Specifically, the region V161 corresponds to a region before the cutout position is corrected. Furthermore, the region V163 corresponds to a region after the cutout position is corrected. That is, in the example illustrated in FIG. 6, the position of a region cut out as the output image V129 from the input image V120 corresponding to the frame N+1 is corrected in accordance with the image shift between the frame N and the frame N+1 similarly to the example illustrated in FIG. 5, so that the camera shake between the frame N and the frame N+1 is corrected.

On the other hand, as described above with reference to FIG. 4, in a case where the exposure time SS of some of the plurality of exposures in one frame is shorter than the reading time T1 of the imaging element (SS<T1), a double image may appear in the generated HDR image. For example, in the example illustrated in FIG. 6, a double image appears in the input image V160 corresponding to the frame N+1. At this time, in the camera shake correction processing described with reference to FIG. 5, an output image is cut out from an input image for each frame as a unit. Therefore, for example, as in the input image V160 illustrated in FIG. 6, even if the position to cut out an output image from an input image having a double image apparent thereon is corrected, a double image still remains. Furthermore, as described above, an HDR image is generated by synthesizing a plurality of images corresponding to the results of the plurality of exposures. From such characteristics, for example, by applying the camera shake correction using any one of the plurality of images as a reference, the shift may be further emphasized in the other images, and as a result, the image may be perceived as an unnatural image, in which blurring of an image is further emphasized.

<2.2. Principle of Double Image Appearance>

Figure 7:
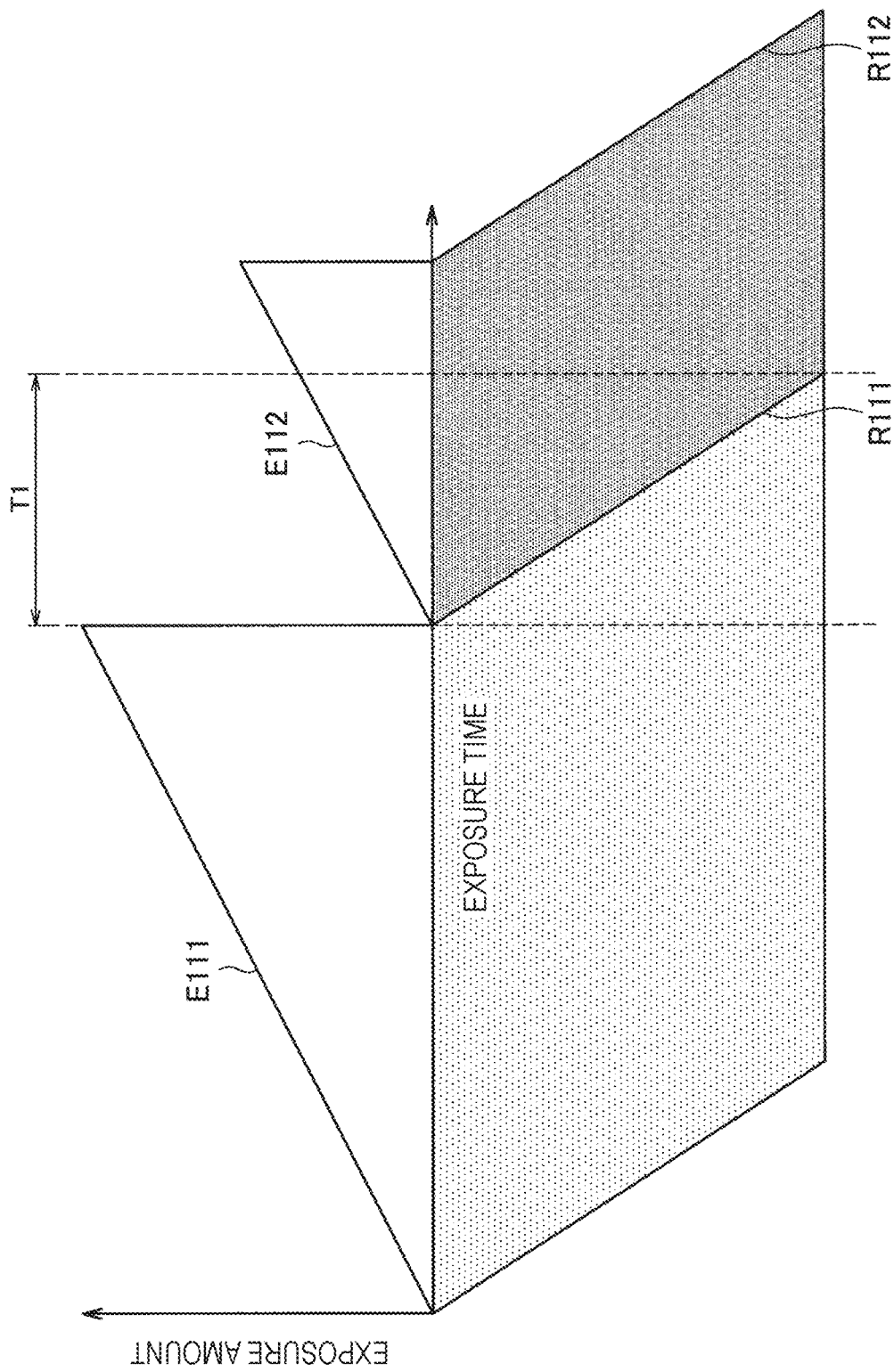
FIG. 7 is an explanatory diagram for describing processing related to generation of an HDR image.
Figure 8:
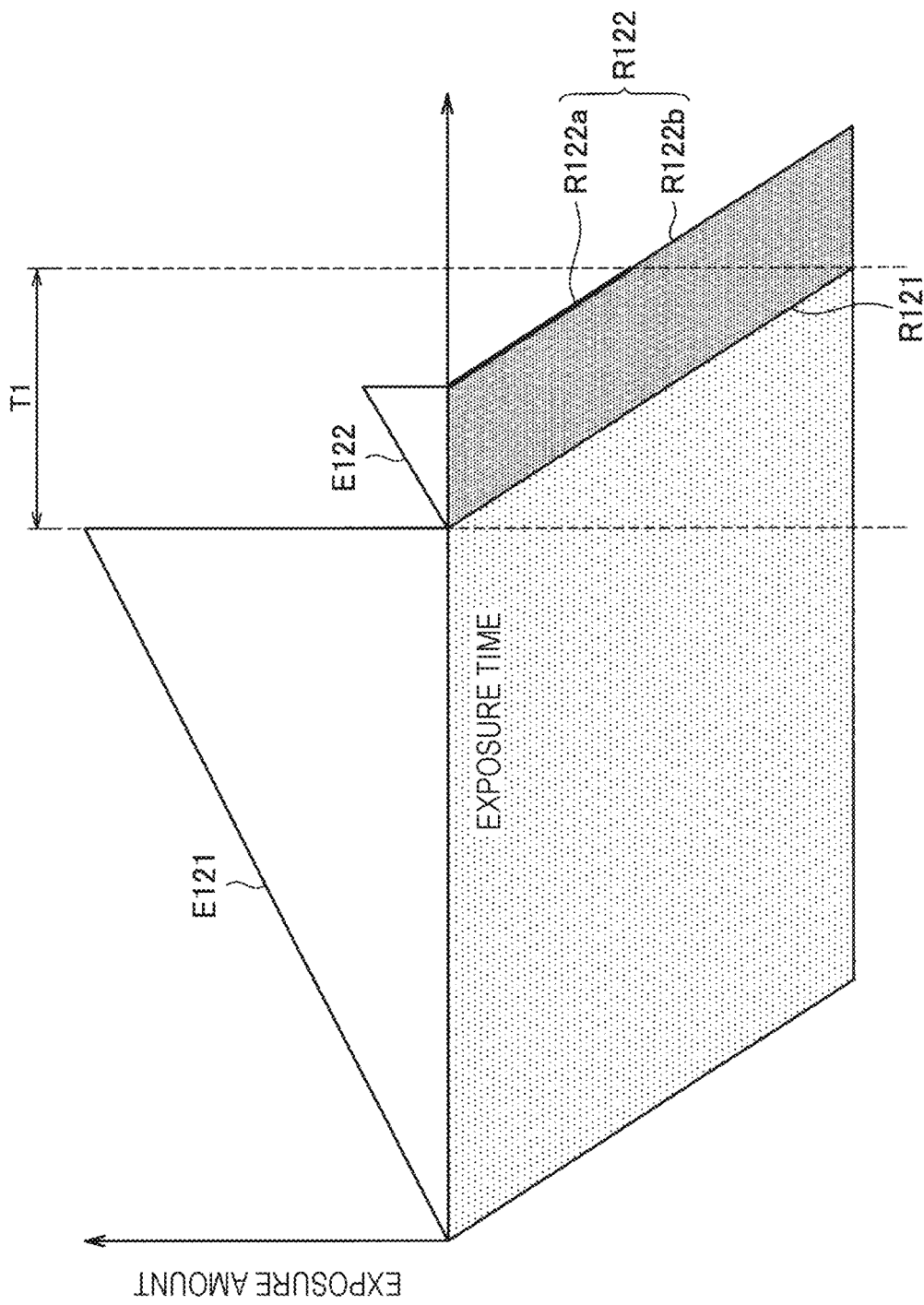
FIG. 8 is an explanatory diagram for describing processing related to generation of an HDR image.
Figure 9:
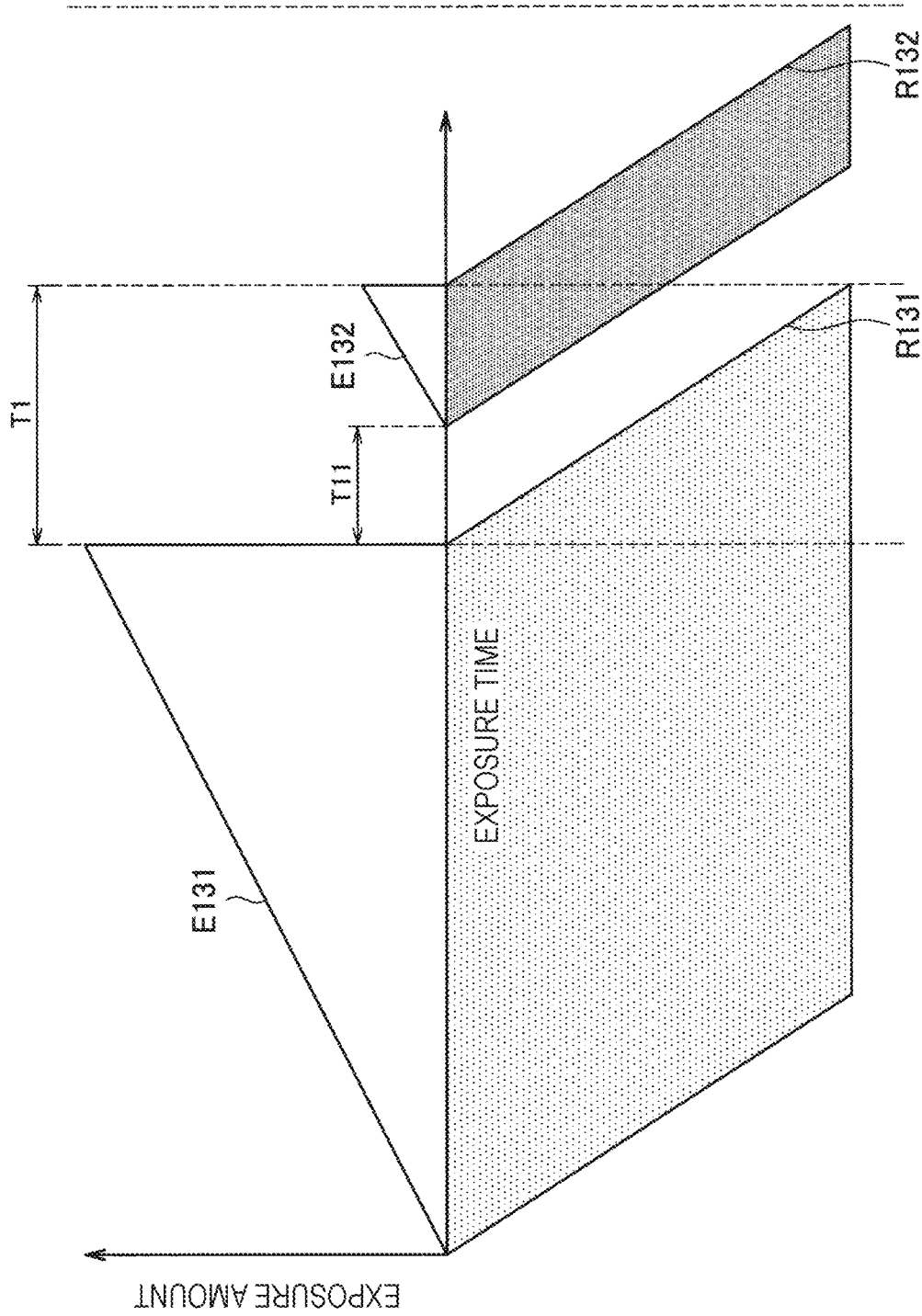
FIG. 9 is an explanatory diagram for describing processing related to generation of an HDR image.

Next, with reference to FIGS. 7 to 9, an overview of the principle of the appearance of a double image when an HDR image is generated will be described. FIGS. 7 to 9 are explanatory diagrams for describing processing related to generation of an HDR image, and each of them illustrates an example of a case where an exposure time SS of some of a plurality of exposures in one frame is changed.

For example, FIG. 7 illustrates an example of a case where the exposure time SS of each of a plurality of exposures in one frame is equal to or longer than the reading time T1 of the imaging element. Specifically, in the example illustrated in FIG. 7, two exposures indicated by reference signs E111 and E112 are performed in this order in a time-division manner in one frame. At this time, the exposure time of the exposure E111 is set longer than the exposure time of the exposure E112. Furthermore, the exposure time of each of the exposures E11' and E112 is set to be longer than the reading time T1 of the imaging element. Under the image capturing conditions described above, it is assumed that a long exposure image is generated by adding the respective exposure results of the exposures E111 and E112, and a short exposure image is generated on the basis of the exposure result of the exposure E112.

Furthermore, in FIG. 7, reference sign R111 indicates schematic illustration of processing related to reading of the exposure result of exposure E111 (hereinafter, also referred to as "reading R111"). That is, in a case where the pixel array of the imaging element includes H rows of pixels in the vertical direction, the reading R111 indicates schematic illustration of a situation, in which data is read sequentially from the first row to the H-th row. Similarly, reference sign R112 indicates schematic illustration of processing related to reading of the exposure result of exposure E112 (hereinafter, also referred to as "reading R112").

In the example illustrated in FIG. 7, the reading R111 and the exposure E112 are started after the completion of the exposure E111. At this time, when the exposure E112 is completed, the reading R111 is already completed, so that the reading R112 can be sequentially started. Furthermore, in the example illustrated in FIG. 7, since the exposures E111 and E112 are sequentially performed, ideally, a double image does not appear in a long exposure image generated by adding the respective exposure results of the exposures E111 and E112.

In comparison to the example described above, FIG. 8 illustrates an example of a case where the exposure time SS of some of a plurality of exposures in one frame is shorter than the reading time T1 of the imaging element. Specifically, in the example illustrated in FIG. 8, two exposures indicated by reference signs E121 and E122 are performed in this order in a time-division manner in one frame. At this time, the exposure time of the exposure E121 is set longer than the exposure time of the exposure E122. Furthermore, the exposure time of the exposure E122 is set shorter than the reading time T1 of the imaging element. Under the image capturing conditions described above, it is assumed that a long exposure image is generated by adding the respective exposure results of the exposures E121 and E122, and a short exposure image is generated on the basis of the exposure result of the exposure E122.

Furthermore, in FIG. 8, reference sign R121 indicates schematic illustration of processing related to reading of the exposure result of exposure E121 (hereinafter, also referred to as "reading R121"). Similarly, reference sign R122 indicates schematic illustration of processing related to reading of the exposure result of the exposure E122 (hereinafter, also referred to as "reading R122").

In the example illustrated in FIG. 8, the reading R121 and the exposure E122 are started after the completion of the exposure E121. Therefore, in this case, the exposure E122 is completed before the reading R121 is completed, and thus, the reading R122 is started before the reading R121 is completed as long as there is no particular restriction.

On the other hand, there are some imaging elements having hardware restrictions that, in a case where the pixel array of the imaging element includes H rows of pixels in the vertical direction, makes it difficult to start reading from a first row based on an exposure before completion of reading the last H-th row in a previous exposure. With such an imaging element, in the case of the example illustrated in FIG. 8, the reading R122 of the exposure result of the exposure E122 is restricted until the reading R121 of the exposure result of the exposure E121 is completed. That is, in a case where the reading R122 is divided into the reading R122a executed before the completion of the reading R121 and the reading R122b executed after the completion of the reading R121, the execution of the reading R122a is restricted.

Therefore, with the imaging element having a restriction in reading of the exposure result as described above, the start timing of some of the exposures may be controlled in such a manner that the periods of reading the exposure results of exposures do not overlap.

For example, FIG. 9 illustrates an example of a case where the exposure time SS of some of a plurality of exposures in one frame is shorter than the reading time T1 of the imaging element and the start timing of the exposure with the shorter exposure time SS is restricted.

Specifically, in the example illustrated in FIG. 9, exposures E131 and E132 correspond to the exposures E121 and E122 in the example illustrated in FIG. 8.

Furthermore, in FIG. 9, reference sign R131 indicates schematic illustration of processing related to reading of the exposure result of the exposure E131 (hereinafter, also referred to as "reading R131"). Similarly, reference sign R132 indicates schematic illustration of processing related to reading of the exposure result of the exposure E132 (hereinafter, also referred to as "reading R132").

That is, in the example illustrated in FIG. 9, the start timing of the exposure E132 is controlled such that the reading R132 of the exposure result of the exposure E132 is started after the reading R131 of the exposure result of the exposure E131 is completed. With such control, a period T11, during which exposure is not performed (hereinafter, also referred to as a "blank period T11"), is generated after the completion of the exposure E131 and before the start of the exposure E132. That is, similarly to the example described above with reference to the lower figure of FIG. 4, in a case where a long exposure image is generated by synthesizing the respective exposure results of the exposures E131 and E132, the lack of information during the blank period T11 is apparent in the long exposure image as blurring of the subject (i.e., a double image).

Figure 10:
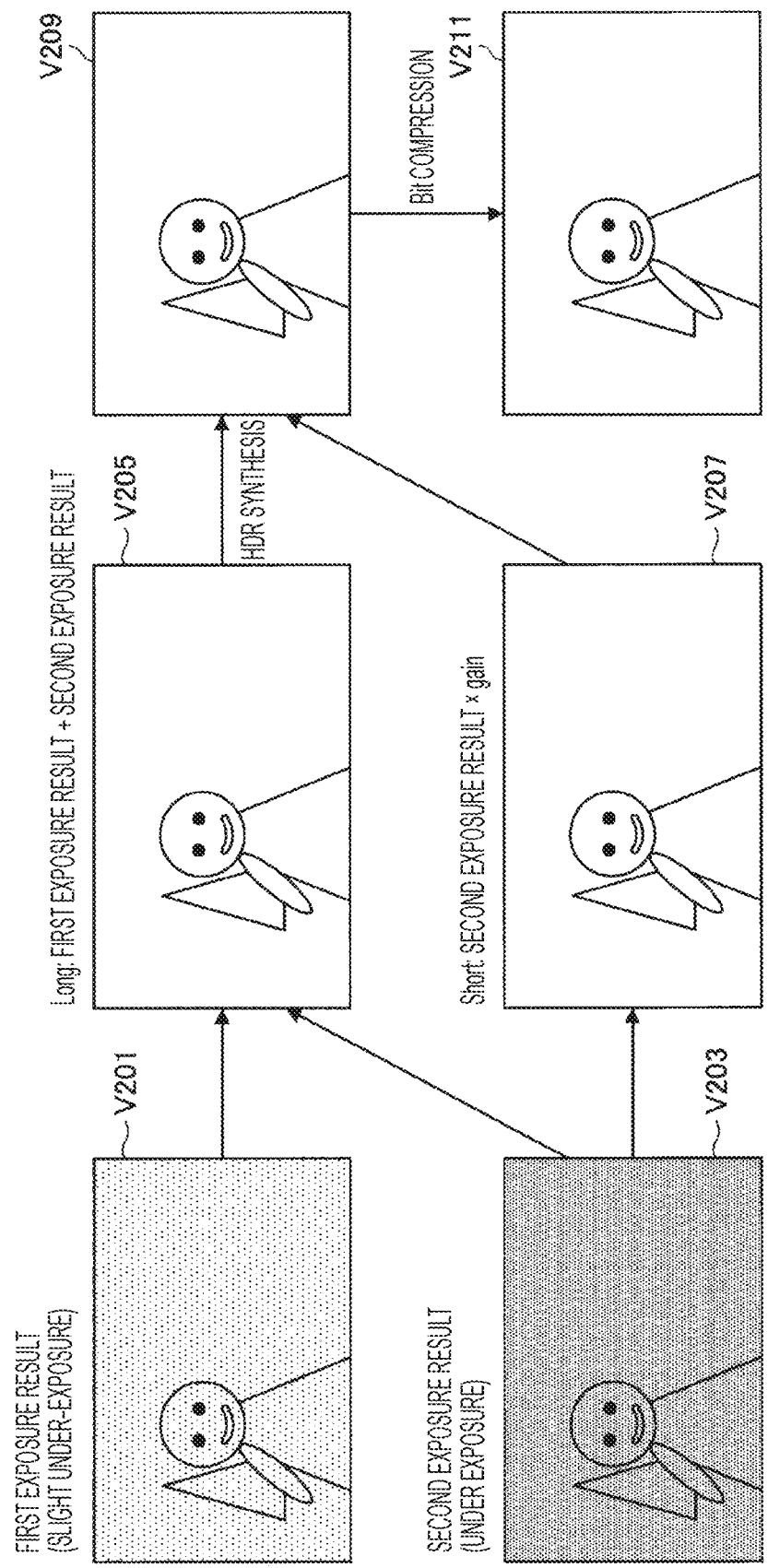
FIG. 10 is an explanatory diagram for describing an example of a flow of the processing related to generation of an HDR image.
Figure 11:
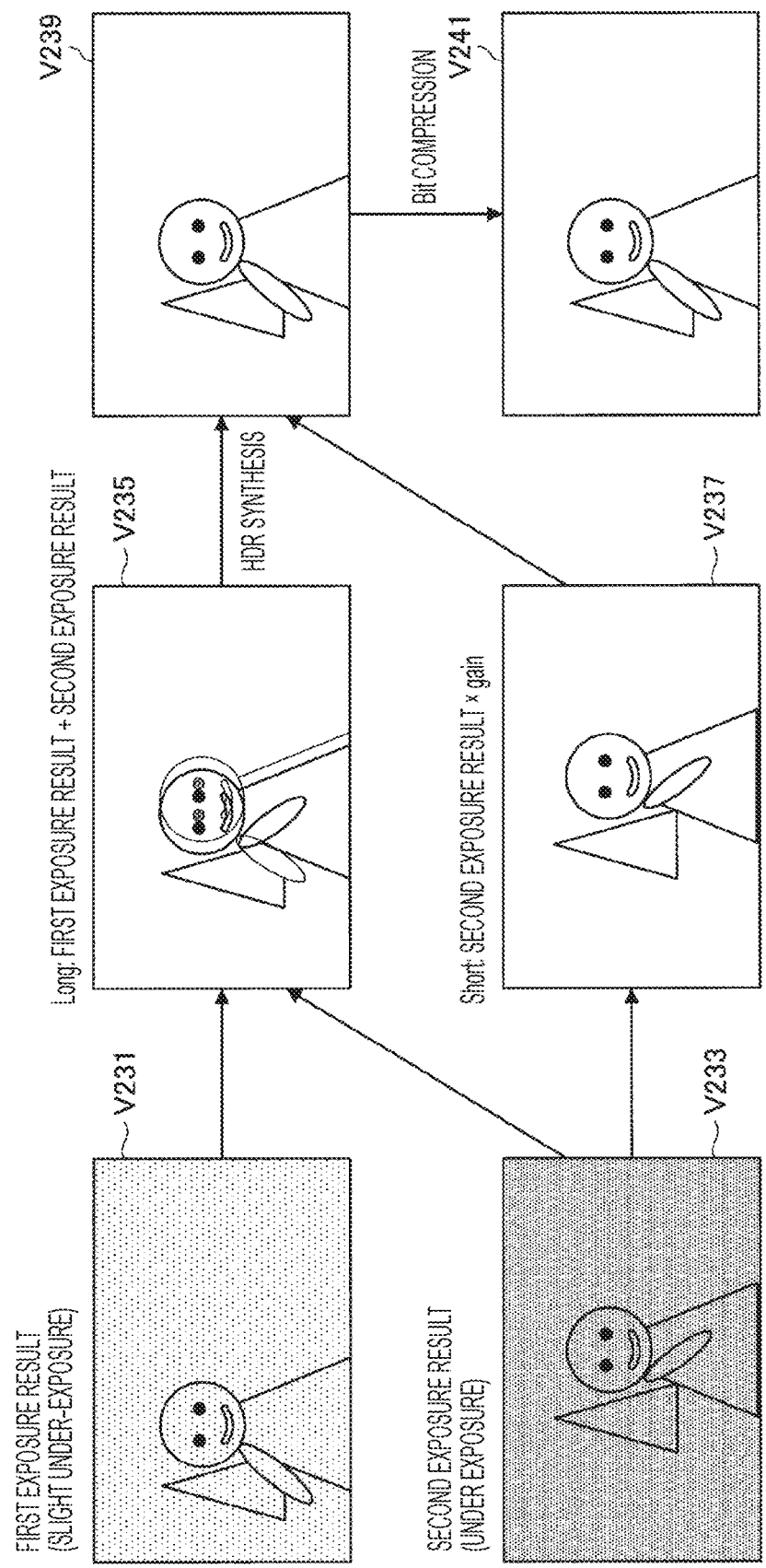
FIG. 11 is an explanatory diagrams for describing an example of a flow of the processing related to generation of an HDR image.

Here, with reference to FIGS. 10 and 11, an example of a flow of processing related to generation of an HDR image will be described, so that a mechanism that causes a double image to appear in the HDR image will be described in further detail. FIGS. 10 and 11 are explanatory diagrams for describing an example of the flow of the processing related to generation of an HDR image.

First, with reference to FIG. 10, a basic flow of processing related to generation of an HDR image will be described taking a case where an image of a still subject is captured as an example. In the example illustrated in FIG. 10, it is assumed similarly to the example illustrated in FIG. 7 that a first exposure and a second exposure with a shorter exposure time than the first exposure are performed in this order in one frame, and an HDR image is generated on the basis of the respective exposure results of the first exposure and the second exposure.

Specifically, in FIG. 10, reference sign V201 indicates schematic illustration of an exposure result of the first exposure (hereinafter, also referred to as "first exposure result"). Furthermore, reference sign V203 indicates schematic illustration of an exposure result of the second exposure (hereinafter, also referred to as "second exposure result"). Note that since the exposure period of each of the first exposure and the second exposure is shorter than one frame, the first exposure result V201 and the second exposure result V203 tend to be underexposure. Furthermore, at this time, the exposure period of the second exposure is shorter than that of the first exposure. Therefore, the second exposure result V203 tends to be more underexposure than the first exposure result V201.

Under such an assumption, the first exposure result V201 and the second exposure result V203 are synthesized (added) to generate a long exposure image V205. In the long exposure image V205, a portion where the value acquired by synthesizing the exposure results (in other words, the pixel value) exceeds the bit range of the imaging element is saturated, and is apparent as an overexposure.

Furthermore, by performing gain adjustment processing on the second exposure result V203, a short exposure image V207 after correction such that the brightness is higher (that is, to be brighter) than the second exposure result V203 is generated. Note that since the short exposure image V207 can be controlled in a bit range wider than the bit range of the imaging element, even if there is a portion exceeding the bit range of the imaging element after correction, the information of the portion is not saturated and kept.

Then, HDR synthesis of the long exposure image V205 and the short exposure image V207 generates an HDR image V209 having a wider bit range than the image captured by the imaging element. At this time, information of a portion of the long exposure image V207 exceeding the bit range of the imaging element (that is, a portion where overexposure occurs) is interpolated by the short exposure image V209. Furthermore, in the short exposure image V209, the influence of noise tends to be more apparent in a portion having a relatively low brightness than in a portion having a high brightness. Therefore, in the short exposure image V209, information of a portion where brightness is relatively low and thus the influence of noise is more likely to be apparent is complemented by the long exposure image V207. As described above, it is possible to generate the HDR image V209 having a substantially wider bit range than the long exposure image V205 and the short exposure image V207.

Note that the generated HDR image V209 may be output to an external circuit after the bit range is adjusted by bit compression. For example, reference sign V211 indicates an output image having a bit range adjusted by performing bit compression on the HDR image V209.

With reference to FIG. 10, the basic flow of processing related to generation of an HDR image has been described taking a case where an image of a still subject is captured as an example.

Next, with reference to FIG. 11, a mechanism that causes a double image to appear at the time of generating an HDR image will be described taking a case where an image of a moving subject is captured as an example. In the example illustrated in FIG. 11, it is assumed similarly to the example illustrated in FIG. 9 that a first exposure and a second exposure with a shorter exposure time than the first exposure are performed in this order in one frame, and an HDR image is generated on the basis of the respective exposure results of the first exposure and the second exposure. Furthermore, similarly to the example illustrated in FIG. 9, it is assumed that the exposure time SS of the second exposure is set to be shorter than the reading time T1 of the imaging element. That is, a blank is generated between the first exposure and the second exposure.

Specifically, in FIG. 11, reference sign V231 indicates schematic illustration of a first exposure result. Furthermore, reference sign V233 schematically illustrates a second exposure result. Furthermore, similarly to the example illustrated in FIG. 10, since the exposure period of each of the first exposure and the second exposure is shorter than one frame, the first exposure result V231 and the second exposure result V233 tend to be underexposure. Furthermore, at this time, the exposure period of the second exposure is shorter than that of the first exposure. Therefore, the second exposure result V233 tends to be more underexposure than the first exposure result V231.

Under such an assumption, the first exposure result V231 and the second exposure result V233 are synthesized (added) to generate a long exposure image V235. Note that since a blank period is generated between the first exposure and the second exposure, a double image appears in the long exposure image V235. In the double image that appears in the long exposure image V235, a portion where the subject captured in the first exposure result V231 and the subject captured in the second exposure result V233 are superimposed is adjusted to an appropriate exposure, and for the other portion, the exposure of each exposure result (that is, underexposure) is reflected.

Furthermore, by performing gain adjustment processing on the second exposure result V233, a short exposure image V237 after correction such that the brightness is higher than the second exposure result V233 is generated.

Then, HDR synthesis of the long exposure image V235 and the short exposure image V237 generates an HDR image V239 having a wider bit range than the image captured by the imaging element. Furthermore, the generated HDR image V239 may be output to an external circuit after the bit range is adjusted by bit compression. For example, reference sign V241 indicates an output image having a bit range adjusted by performing bit compression on the HDR image V239.

Note that in a case where a double image appears in the long exposure image V235, a double image similarly appears in the HDR image V239 generated on the basis of the long exposure image V235 and in the output image V241 generated by adjusting the bit range of the HDR image V239.

Furthermore, if camera shake correction is performed on the basis of the HDR image V239 generated in this way, blurring in the image may be further emphasized. Specifically, the first exposure and the second exposure are performed at different timings and for different exposure periods. Therefore, when the shift between the long exposure image V235 based on the first exposure result V231 and the second exposure result V233 and the short exposure image V237 based on the second exposure result V233 in a frame is compared with the shift in a different frame, they may not match. Under such situation, for example, when camera shake correction is applied with reference to the long exposure image V235, blurring of the short exposure image V237 between frames is more emphasized, and as a result, the image may be perceived as an unnatural image.

In view of the situation described above, in the present disclosure, a technology that makes it possible to both ensure the dynamic range of an image and suppress image blurring (particularly, a double image due to the blurring of a subject) in a more suitable manner is proposed.

3. TECHNICAL FEATURES

Next, as a technical feature of the image capturing system according to the embodiment of the present disclosure, a technology that makes it possible to both ensure the dynamic range of an image and suppress image blurring in a more suitable manner will be described.

<3.1 Basic Principle>

First, in the image capturing system according to the embodiment of the present disclosure, a basic principle of a technology that makes it possible to both ensure the dynamic range of an image and suppress image blurring in a more suitable manner will be described.

In the image capturing system according to the present embodiment, in a case where the HDR function is enabled, the signal processing apparatus 200 controls a method of generating an output image in accordance with whether or not a blank period is generated between a plurality of exposures in one frame, as illustrated in FIG. 9. That is, the signal processing apparatus 200 controls a method of generating an output image in accordance with whether or not the exposure time SS of at least one of the plurality of exposures in one frame is shorter than the reading time T1 of the imaging element. Furthermore, at this time, the signal processing apparatus 200 controls a method of generating an output image in accordance with whether or not the camera shake correction function is enabled.

Specifically, in a case where the exposure time SS of each of the plurality of exposures in one frame is equal to or longer than the reading time T1 of the imaging element, or in a case where the camera shake correction function is not enabled, the signal processing apparatus 200 generates an output image (that is, an HDR image) in a similar manner to the example described with reference to FIG. 10.

Figure 12:
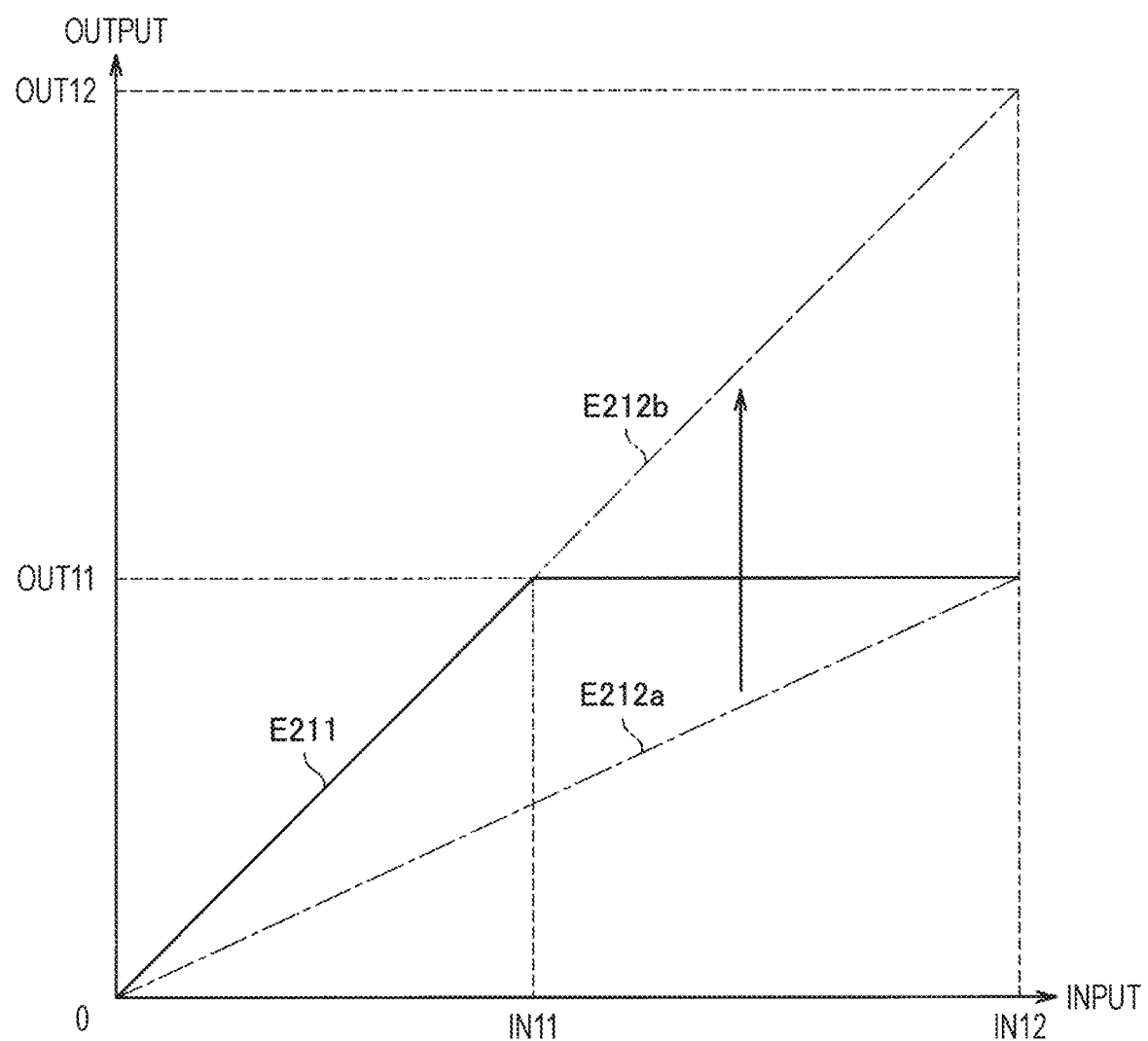
FIG. 12 is an explanatory diagram for describing one aspect of the processing related to generation of an output image by the signal processing apparatus according to the embodiment.

For example, FIG. 12 is an explanatory diagram for describing one aspect of processing related to generation of an output image by the signal processing apparatus 200 according to the present embodiment, and illustrates a relationship between the brightness of a subject (input) and a pixel value output as an image (output). In FIG. 12, the horizontal axis indicates the brightness of the subject, and the vertical axis indicates the pixel value output as an image. Reference sign OUT11 indicates the upper limit of the dynamic range of the imaging element. That is, the output value OUT11 corresponds to the maximum pixel value that can be output as an exposure result by the imaging element. Furthermore, reference sign IN11 indicates the brightness of the subject corresponding to the output value OUT11. On the other hand, reference sign OUT12 indicates the maximum pixel value that can be output as an HDR image. Furthermore, reference sign IN12 indicates the brightness of the subject corresponding to the output value OUT12.

Furthermore, in FIG. 12, reference sign E211 indicates an input/output relationship in a long exposure image (for example, the long exposure image V235 in FIG. 10). In a case where the long exposure image E211 is controlled so as to be an appropriate exposure as illustrated in FIG. 12, it is possible to acquire an output equivalent to an input within the dynamic range of the imaging element. On the other hand, for an input exceeding the dynamic range of the imaging element, the output is saturated. That is, in the long exposure image E211, a portion brighter than the input value IN11 among portions of the subject is output as the output value OUT11 (that is, saturated), and an overexposure, in which the gradation is not correctly expressed, occurs.

On the other hand, reference sign E212a indicates an input/output relationship in a short exposure image (for example, the second exposure result V233 in FIG. 10). In the short exposure image E212a, the exposure time is set shorter than that of the long-travel image E211, so that the short exposure image E212a is more underexposure than the long exposure image E211, but the gradation up to the input value IN12 is reproduced in the exposure result of the imaging element.

Using the above characteristics, in the example illustrated in FIG. 12, the signal processing apparatus 200 generates an HDR image by using the long exposure image E211 for a portion where the brightness of the subject is darker than the input value IN11 and using the short exposure image E212a for a portion that is brighter than the input value IN11. Specifically, the signal processing apparatus 200 performs gain adjustment processing on the short exposure image E212a to correct the short exposure image E212a so that the brightness of the short exposure image E212a becomes higher. For example, reference sign E212b indicates an input/output relationship in the short exposure image after gain adjustment processing is performed. Then, the signal processing apparatus 200 synthesizes a portion of the long exposure image E211 having a brightness that is equal to or less than the output value OUT11 and a portion of the short exposure image E212b after gain adjustment processing having a brightness exceeding the output value OUT11 to generate an output image (HDR image).

On the other hand, in a case where at least one of the exposure times SS of the plurality of exposures in one frame is shorter than the reading time T1 of the imaging element, and the camera shake correction function is enabled, the signal processing apparatus 200 generates an output image on the basis of an exposure result of the at least one of the plurality of exposures.

Figure 13:
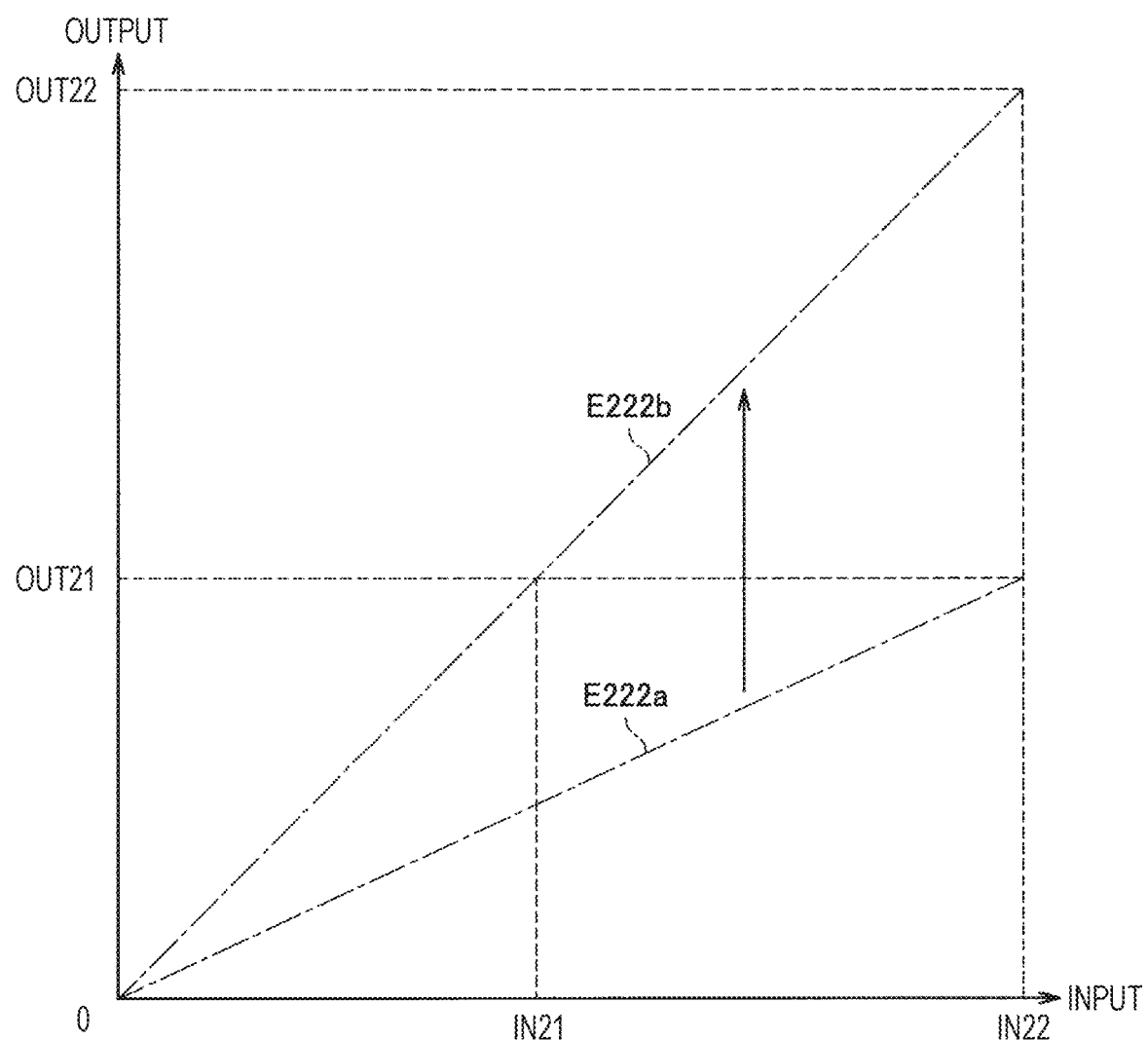
FIG. 13 is an explanatory diagram for describing another aspect of the processing related to generation of an output image by the signal processing apparatus according to the embodiment.

For example, FIG. 13 is an explanatory diagram for describing another aspect of processing related to generation of an output image by the signal processing apparatus 200 according to the present embodiment, and illustrates a relationship between the brightness of a subject (input) and a pixel value output as an image (output). The horizontal axis and the vertical axis in FIG. 13 are similar to the horizontal axis and the vertical axis in FIG. 12. Furthermore, the input values IN21 and IN22 correspond to the input values IN11 and IN12 in FIG. 12. Similarly, the output values OUT21 and OUT22 correspond to the output values OUT11 and OUT12 in FIG. 12.

Furthermore, in FIG. 13, reference sign E222a indicates an input/output relationship in a short exposure image (for example, the second exposure result V233 in FIG. 10) and corresponds to the short exposure image E212a in FIG. 12. Furthermore, reference sign E222b indicates an input/output relationship after gain adjustment processing is performed on the short exposure image E222a and corresponds to the short exposure image E212b in FIG. 12.

That is, in the example illustrated in FIG. 13, the signal processing apparatus 200 corrects the brightness of the short exposure image based on the exposure result of at least one of the plurality of exposures in one frame (for example, the second exposure result V233 in FIG. 11) to generate an output image. In this case, since the long exposure image (that is, the image having a double image apparent therein) is not used for generating the output image, the appearance of a double image in the output image is suppressed.

Meanwhile, in the short exposure image E222a, the influence of noise may be greater (for example, the SN ratio may be smaller) in a portion of the subject where the brightness is less than a threshold corresponding to the sensitivity of the imaging element. In such a portion where the influence of the noise is greater, the noise tends to become more apparent due to gain adjustment processing. Therefore, for example, in the example illustrated in FIG. 13, a portion where the influence of noise tends to be more apparent (that is, a portion where the output value is less than a certain threshold) is restricted to be output as an output image. Note that even in a case where such control is performed, it is possible to ensure a wider dynamic range than the case where the long exposure image E212 and the short exposure image E212a are output as they are.

As described above, the signal processing apparatus 200 according to the present embodiment selectively switches the processing related to generation of an output image in accordance with whether or not the image capturing conditions are conditions under which a double image tends to appear. With such a configuration, the signal processing apparatus 200 can achieve both ensuring the dynamic range of an image and suppression of image blurring in a more suitable manner in accordance with the image capturing conditions at each time.

Note that the output image generated by the method described with reference to FIG. 13 corresponds to an example of a "first output image". On the other hand, an output image (that is, an HDR image) generated by the method described with reference to FIG. 12 corresponds to an example of a "second output image". As described above, exposure time (in other words, shutter speed) can be an example of a factor related to switching between the processing related to generation of a first output image and the processing related to generation of a second output image. From such characteristics, for example, a control may be performed such that the first output image is generated in a situation where the shutter speed is long such as a dark scene, and the second output image is generated in a situation where the shutter speed is short such as a bright scene.

With reference to FIGS. 12 and 13, in the image capturing system according to the embodiment of the present disclosure, the basic principle of the technology that makes it possible to both ensure the dynamic range of an image and suppress image blurring in a more suitable manner has been described.

<3.2. Processing>

Next, an example of a flow of a series of steps of processing of the signal processing apparatus 200 according to the embodiment of the present disclosure will be described, particularly focusing on a part of selectively switching processing related to generation of an output image in accordance with the image capturing conditions. For example, FIG. 14 is a flowchart illustrating an example of a flow of a series of steps of processing of the signal processing apparatus 200 according to the present embodiment, and illustrates a flow of processing related to generation of an output image.

Figure 14:
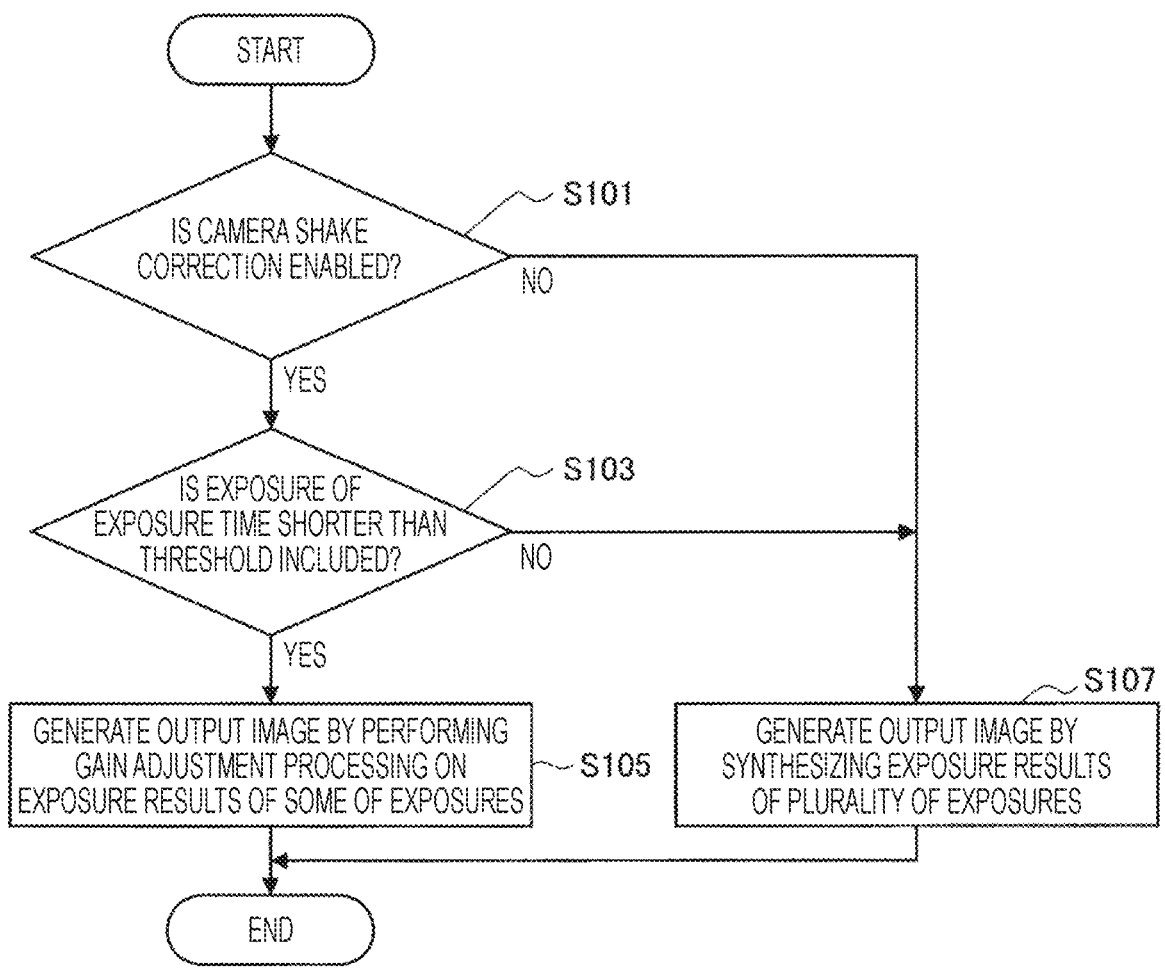
FIG. 14 is a flowchart illustrating an example of a flow of a series of steps of processing of the signal processing apparatus 200 according to the embodiment.

As illustrated in FIG. 14, in a case where the camera shake correction is not enabled (S101, NO), the signal processing apparatus 200 generates an output image (that is, an HDR image) by synthesizing the exposure results of a plurality of exposures performed during one frame (S107). Furthermore, the signal processing apparatus 200 generates an output image (that is, an HDR image) by synthesizing the exposure results of the plurality of exposures during one frame (S107) even in a case where the camera shake correction is enabled (S101, YES) if the exposure time of each of the plurality of exposures in one frame is equal to or longer than a threshold (S103, NO). With such control, an image having a wide dynamic range (HDR image) is output under image capturing conditions under which a double image does not tend to appear.

On the other hand, in a case where the camera shake correction is enabled (S101, YES) and an exposure time of at least one of the plurality of exposures in one frame is shorter than the threshold (S103, YES), the signal processing apparatus 200 generates an output image by performing gain adjustment processing on the exposure result of some of the exposures (S105). With such control, even under image capturing conditions under which a double image tends to appear, the appearance of a double image is suppressed, and an output image having a wider dynamic range than the individual exposure results is output. In other words, even under the conditions, an output image that achieves both ensuring the dynamic range of the image and suppression of image blurring as much as possible is output.

The example of a flow of the series of steps of processing of the signal processing apparatus 200 according to the embodiment of the present disclosure has been described with reference to FIG. 14, particularly focusing on a part of selectively switching processing related to generation of an output image in accordance with the image capturing conditions.

4. HARDWARE CONFIGURATION

Next, with reference to FIG. 15, an example of the hardware configuration of the information processing apparatus in a case where the signal processing apparatus (for example, the signal processing apparatus 200 illustrated in FIG. 1) included in the image capturing system according to the present embodiment is configured as an external information processing apparatus such as a server will be described. FIG. 15 is a functional block diagram illustrating an example of a hardware configuration of an information processing apparatus 900 included in the image capturing system according to the embodiment of the present disclosure.

The information processing apparatus 900 included in the image capturing system according to the present embodiment mainly includes a CPU 901, a ROM 903, and a RAM 905. Furthermore, the information processing apparatus 900 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls entire operation or a part of the operation in the information processing apparatus 900 according to various programs recorded in the ROM 903, the RAM 905, the storage device 919, or a removable recording medium 927. The ROM 903 stores programs, operation parameters, and the like used by the CPU 901. The RAM 905 temporarily stores programs used by the CPU 901 and parameters that change as appropriate in execution of the programs, for example. These are mutually connected by the host bus 907 formed by an internal bus such as a CPU bus. Note that the signal processing unit 201 and the control unit 203 described above with reference to FIG. 3 can be implemented by, for example, the CPU 901.

The host bus 907 is connected to the external bus 911 such as a Peripheral Component Interconnect/Interface (PCI) bus via the bridge 909. Furthermore, the input device 915, the output device 917, the storage device 919, the drive 921, the connection port 923, and the communication device 925 are connected to the external bus 911 via the interface 913.

The input device 915 is an operation unit operated by a user such as a mouse, a keyboard, a touch panel, a button, a switch, a lever, a pedal, or the like. Furthermore, the input device 915 may be, for example, a remote control unit (a remote controller) using infrared or other electric waves, or an external connection device 929 such as a mobile phone or a PDA compatible with the operation of the information processing apparatus 900. Moreover, the input device 915 includes, for example, an input control circuit that generates an input signal on the basis of information input by a user using the above-described operation unit and outputs the input signal to the CPU 901. By operating the input device 915, a user of the information processing apparatus 900 can input various types of data to the information processing apparatus 900 and instruct the information processing apparatus 900 to perform a processing operation.

The output device 917 includes a device that can visually or audibly notify a user of acquired information. Examples of such a device include a display device such as a CRT display device, a liquid crystal display device, a plasma display device, an EL display device, and a lamp, an audio output device such as a speaker and a headphone, and a printer device, and the like. The output device 917 outputs, for example, results acquired by various types of processing performed by the information processing apparatus 900.

Specifically, the display device displays results acquired by various type of processing performed by the information processing apparatus 900 as texts or images. On the other hand, the audio output device converts an audio signal including reproduced audio data, acoustic data, and the like into an analog signal and outputs the analog signal.

The storage device 919 is a data storage device configured as an example of a storage unit of the information processing apparatus 900. The storage device 919 includes, for example, a magnetic storage device such as a Hard Disk Drive (HDD), a semiconductor storage device, an optical storage device, a magneto-optical storage device, or the like. The storage device 919 stores programs executed by the CPU 901, various types of data, and the like.

The drive 921 is a reader/writer for a recording medium, and is built in or external to the information processing apparatus 900. The drive 921 reads information recorded in the removable recording medium 927 such as a magnetic disk, an optical disk, or a magneto-optical disk, or a semiconductor memory that is mounted, and outputs the information to the RAM 905. Furthermore, the drive 921 can also write a record in a removable recording medium 927 such as a magnetic disk, an optical disk, or a magneto-optical disk, or a semiconductor memory that is mounted. The removable recording medium 927 is, for example, a DVD medium, an HD-DVD medium, a Blu-ray (registered trademark) medium, or the like. Furthermore, the removable recording medium 927 may be a CompactFlash (CF) (registered trademark), a flash memory, a Secure Digital (SD) memory card, or the like. Furthermore, the removable recording medium 927 may be, for example, an Integrated Circuit (IC) card having a non-contact type IC chip mounted therein, an electronic device, or the like.

The connection port 923 is a port for directly connection to the information processing apparatus 900. Examples of the connection port 923 include a Universal Serial Bus (USB) port, an IEEE1394 port, a Small Computer System Interface (SCSI) port, and the like. Other examples of the connection port 923 include an RS-232C port, an optical audio terminal, a High-Definition Multimedia Interface (HDMI) (registered trademark) port, and the like. By connecting the external connection device 929 to the connection port 923, the information processing apparatus 900 acquires various types of data directly from the external connection device 929 or provides various types of data to the external connection device 929.

The communication device 925 is, a communication interface including, for example, a communication device for connection to a communication network (network) 931 or the like. The communication device 925 is, for example, a communication card for wired or wireless Local Area Network (LAN), Bluetooth (registered trademark), Wireless USB (WUSB), or the like. Furthermore, the communication device 925 may be a router for optical communication, a router for Asymmetric Digital Subscriber Line (ADSL), a modem for various kinds of communication, or the like. The communication device 925 can transmit and receive signals and the like to and from, for example, the Internet and other communication devices according to a predetermined protocol such as TCP/IP. Furthermore, the communication network 931 connected to the communication device 925 includes a network connected by wire or wirelessly or the like, and may be, for example, the Internet, a home LAN, infrared communication, radio wave communication, satellite communication, or the like.

The example of a hardware configuration capable of implementing the function of the information processing apparatus 900 included in the image capturing system according to the embodiment of the present disclosure has been described. Each of the above-described components may be configured using a general-purpose member, or may be configured by hardware dedicated to the function of the component. Therefore, it is possible to appropriately change the hardware configuration to be used in accordance with the technical level at the time of implementing the present embodiment. Note that although not illustrated in FIG. 15, various components corresponding to the information processing apparatus 900 included in the image capturing system according to the present embodiment are naturally provided.

Note that a computer program for implementing each function of the information processing apparatus 900 included in the image capturing system according to the present embodiment as described above can be created and implemented on a personal computer or the like. Furthermore, a computer-readable recording medium having such a computer program stored therein can be provided. The recording medium is, for example, a magnetic disk, an optical disk, a magneto-optical disk, a flash memory, or the like. Furthermore, the above-described computer program may be distributed, for example, via a network without using a recording medium. Furthermore, the number of computers that execute the computer program is not particularly limited. For example, a plurality of computers (for example, a plurality of servers or the like) may execute the computer program in cooperation with each other. Note that a single computer or a system formed by a plurality of computers cooperating with each other is also referred to as a "computer system".

5. CONCLUSION

As described above, in the imaging element system according to the embodiment of the present disclosure, the signal processing apparatus 200 acquires, for each frame, captured images corresponding to results of a plurality of exposures in the frame obtained by a pixel array (sensor part) including a plurality of pixels arranged in an array. Furthermore, the signal processing apparatus 200 generates an output image on the basis of the captured image corresponding to at least one of the above-described plurality of exposures in the frame. With such a configuration, the signal processing apparatus 200 generates a first output image by correcting the brightness of the captured image based on at least one of the above-described plurality of exposures in a case where the camera shake correction function is enabled and the exposure time of the at least one of the plurality of exposures is shorter than a threshold value.

Furthermore, the signal processing apparatus 200 may generate a second output image having a wider dynamic range than the captured image corresponding to each of the plurality of exposures on the basis of the captured images corresponding to the respective results of the above-described plurality of exposures in at least one of a case where the camera shake correction function is not enabled or a case where the plurality of exposures does not include an exposure with a shorter exposure time than the threshold.

With the configuration described above, the signal processing apparatus 200 according to the present embodiment can achieve both ensuring the dynamic range of an image and suppression of image blurring in a more suitable manner in accordance with the image capturing conditions.

The preferred embodiments of the present disclosure have been described in detail with reference to the accompanying drawings, but the technical scope of the present disclosure is not limited to such examples. It is apparent that those having ordinary knowledge in the technical field of the present disclosure can conceive various changes or modifications within the scope of the technical idea described in the claims, and it is understood that the changes and the modifications also belong to the technical scope of the present disclosure.

Furthermore, the effects described in this specification are merely illustrative or exemplary, and are not restrictive. That is, the technology according to the present disclosure can exhibit other effects that are obvious to those skilled in the art from the description in the present specification, in addition to or instead of the above-described effects.

Note that the following configurations also belong to the technical scope of the present disclosure.

(1)

A signal processing apparatus including:

an acquisition unit configured to acquire, for each of frames, captured images corresponding to results of a plurality of exposures in the frame obtained by a sensor part including a plurality of pixels arranged in an array; and a generation unit configured to generate an output image on the basis of the captured image corresponding to a result of at least one of the plurality of exposures in the frame, in which the generation unit, in a case where a camera shake correction function is enabled and an exposure time of at least one of the plurality of exposures is shorter than a threshold, generates a first output image by correcting a brightness of the captured image based on the at least one of the plurality of exposure.

(2)

The signal processing apparatus according to (1) described above, in which the generation unit generates a second output image that is different from the first output image and that has a wider dynamic range than the captured image corresponding to each of the plurality of exposures on the basis of the captured images corresponding to the respective results of the plurality of exposures in at least one of a case where the camera shake correction function is not enabled or a case where the plurality of exposures does not include an exposure with a shorter exposure time than the threshold.

(3)

The signal processing apparatus according to (2) described above, in which the generation unit generates the second output image by synthesizing a first captured image corresponding to the results of the plurality of exposures and a second captured image corresponding to the at least one of the plurality of exposures.

(4)

The signal processing apparatus according to (3) described above, in which the generation unit generates the second output image by correcting a brightness of the second captured image and synthesizing the corrected second captured image and the first captured image.

(5)

The signal processing apparatus according to any one of (1) to (4), in which exposure times of the plurality of exposures are different from each other.

(6)

The signal processing apparatus according to (5) described above, in which in a case where an exposure time of an exposure that is short among the plurality of exposures is shorter than the threshold, the generation unit generates the first output image by correcting the brightness of the captured image based on the exposure.

(7)

The signal processing apparatus according to any one of (1) to (6), in which the camera shake correction function is a function of correcting blurring of an image between the frames by controlling a position at which a part of an image captured by the sensor part is cut out as the captured image in accordance with an amount of the blurring.

(8)

The signal processing apparatus according to any one of (1) to (7), in which the generation unit outputs a plurality of the output images each generated for one of the frames as a moving image.

(9)

A signal processing method that causes a computer to perform:

acquiring, for each of frames, captured images corresponding to results of a plurality of exposures in the frame obtained by a sensor part including a plurality of pixels arranged in an array; and generating an output image on the basis of the captured image corresponding to a result of at least one of the plurality of exposures in the frame, in which in a case where a camera shake correction function is enabled and an exposure time of at least one of the plurality of exposures is shorter than a threshold, a first output image is generated by correcting a brightness of the captured image based on the at least one of the plurality of exposure.

REFERENCE SIGNS LIST

1 Image capturing system
100 Solid-state image capturing apparatus
102 Pixel
103 Pixel array
104 Vertical driving circuit
105 Column signal processing circuit
106 Horizontal driving circuit
107 Output circuit
108 Control circuit
109 Vertical signal line
110 Horizontal signal line
111 Semiconductor substrate
112 Input/output terminal
200 Signal processing apparatus
201 Signal processing unit
203 Control unit

The invention claimed is:

1. A signal processing apparatus comprising:
an acquisition unit configured to acquire, for each of frames, captured images corresponding to results of a plurality of exposures in the frame obtained by a sensor part including a plurality of pixels arranged in an array; and a generation unit configured to generate an output image on a basis of the captured image corresponding to a result of at least one of the plurality of exposures in the frame, wherein the generation unit, in a case where a camera shake correction function is enabled and an exposure time of at least one of the plurality of exposures is shorter than a threshold, generates a first output image by correcting a brightness of the captured image based on the at least one of the plurality of exposure.

2. The signal processing apparatus according to claim 1, wherein the generation unit generates a second output image that is different from the first output image and that has a wider dynamic range than the captured image corresponding to each of the plurality of exposures on a basis of the captured images corresponding to the respective results of the plurality of exposures in at least one of a case where the camera shake correction function is not enabled or a case where the plurality of exposures does not include an exposure with a shorter exposure time than the threshold.

3. The signal processing apparatus according to claim 2, wherein the generation unit generates the second output image by synthesizing a first captured image corresponding to the results of the plurality of exposures and a second captured image corresponding to the at least one of the plurality of exposures.

4. The signal processing apparatus according to claim 3, wherein the generation unit generates the second output image by correcting a brightness of the second captured image and synthesizing the corrected second captured image and the first captured image.

5. The signal processing apparatus according to claim 1, wherein exposure times of the plurality of exposures are different from each other.

6. The signal processing apparatus according to claim 5, wherein in a case where an exposure time of an exposure that is short among the plurality of exposures is shorter than the threshold, the generation unit generates the first output image by correcting the brightness of the captured image based on the exposure.

7. The signal processing apparatus according to claim 1, wherein the camera shake correction function is a function of correcting blurring of an image between frames by controlling a position at which a part of an image captured by the sensor part is cut out as the captured image in accordance with an amount of the blurring.

8. The signal processing apparatus according to claim 1, wherein the generation unit outputs a plurality of the output images each generated for one of the frames as a moving image.

9. A signal processing method that causes a computer to perform:

acquiring, for each of frames, captured images corresponding to results of a plurality of exposures in the frame obtained by a sensor part including a plurality of pixels arranged in an array; and generating an output image on a basis of the captured image corresponding to a result of at least one of the plurality of exposures in the frame, wherein in a case where a camera shake correction function is enabled and an exposure time of at least one of the plurality of exposures is shorter than a threshold, a first output image is generated by correcting a brightness of the captured image based on the at least one of the plurality of exposure.

* * * * *